(12) United States Patent
Ando et al.

(10) Patent No.: US 7,443,651 B2
(45) Date of Patent: Oct. 28, 2008

(54) ORGANIC ELECTROLYTE CAPACITOR

(75) Inventors: Nobuo Ando, Tokyo (JP); Kenji Kojima, Tokyo (JP); Shinichi Tasaki, Tokyo (JP); Hiromoto Taguchi, Tokyo (JP); Tsutomu Fujii, Tokyo (JP); Yukinori Hato, Tokyo (JP); Chisato Marumo, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 322 days.

(21) Appl. No.: 10/573,943

(22) PCT Filed: Sep. 27, 2004

(86) PCT No.: PCT/JP2004/014550

§ 371 (c)(1),
(2), (4) Date: Mar. 29, 2006

(87) PCT Pub. No.: WO2005/031773

PCT Pub. Date: Apr. 7, 2005

(65) Prior Publication Data

US 2007/0002524 A1  Jan. 4, 2007

(30) Foreign Application Priority Data

Sep. 30, 2003 (JP) ............................. 2003-341129

(51) Int. Cl.
*H01G 9/00* (2006.01)
(52) U.S. Cl. ....................................... 361/503; 361/502
(58) Field of Classification Search .......... 361/502–503
See application file for complete search history.

(56) References Cited

U.S. PATENT DOCUMENTS

| 5,953,204 A | 9/1999 | Suhara et al. |
| 6,294,292 B1 | 9/2001 | Tsushima et al. |
| 6,461,769 B1 | 10/2002 | Ando et al. |
| 2007/0002523 A1* | 1/2007 | Ando et al. ................ 361/503 |

FOREIGN PATENT DOCUMENTS

| JP | 60-182670 A | 9/1985 |
| JP | 64-14882 A | 1/1989 |
| JP | 1-44212 B2 | 9/1989 |
| JP | 3-24024 B2 | 4/1991 |
| JP | 8-102333 A | 4/1996 |
| JP | 8-107048 A | 4/1996 |
| JP | 8-162159 A | 6/1996 |
| JP | 8-255633 A | 10/1996 |
| JP | 9-55342 A | 2/1997 |
| JP | 9-232190 A | 9/1997 |
| JP | 10-144295 A | 5/1998 |

(Continued)

*Primary Examiner*—Eric Thomas
(74) *Attorney, Agent, or Firm*—Darby & Darby P.C.

(57) ABSTRACT

An organic electrolyte capacitor. The organic capacitor is made up of a positive electrode, a negative electrode, and an electrolyte capable of transporting lithium ions. The organic capacitor exhibits a small change in internal resistance during charge and discharge, a high energy and a high output power, and allows lithium ions to move with ease. This is achieved by having a positive electrode that is able to support lithium ions and anions reversibly, a negative electrode that is able to support lithium ions reversibly, and controlling the ratio of positive electrode active material to negative electrode active material within an optimized range.

15 Claims, 8 Drawing Sheets

FOREIGN PATENT DOCUMENTS

| | | |
|---|---|---|
| JP | 11-54383 A | 2/1999 |
| JP | 11-297578 A | 10/1999 |
| JP | 2000-306609 A | 11/2000 |
| JP | 3485935 B2 | 1/2004 |
| WO | WO-98/33227 A1 | 7/1998 |

\* cited by examiner

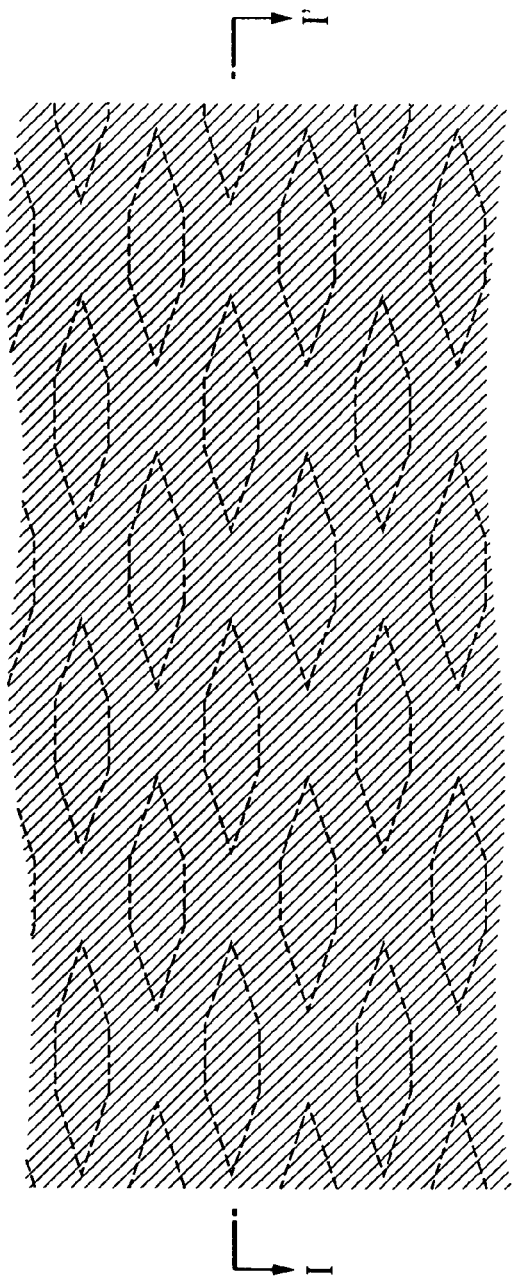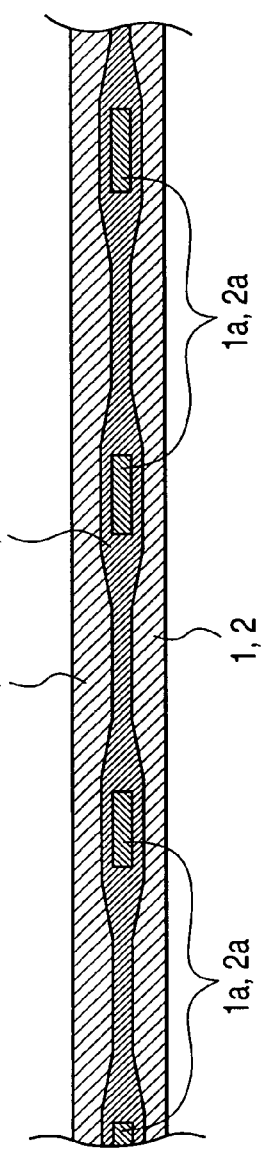

ORGANIC ELECTROLYTE CAPACITOR

CROSS-REFERENCE TO PRIOR APPLICATION

This is a U.S. national phase application under 35 U.S.C. §371 of International Patent Application No. PCT/JP2004/014550 filed Sep. 27, 2004, and claims the benefit of Japanese Patent Application No. 2003-341129, filed Sep. 30, 2003 which are incorporated by reference herein. The International Application was published in Japanese on Apr. 7, 2005 as WO 2005/031773 A1 under PCT Article 21(2).

TECHNICAL FIELD

The present invention relates to an organic electrolyte capacitor having a high energy density and a high power density.

RELATED ART

Recently, a rechargeable battery using a conductive polymer, a transition metal oxide, etc. as a positive electrode and lithium metal or lithium alloy as a negative electrode has been proposed as an alternative to a Ni—Cd battery and a lead-acid battery, due to its high energy density.

These rechargeable batteries, however, suffer a significant reduction in capacity caused by deterioration in the positive electrode or the negative electrode when charged and discharged repetitively, and such a problem that needs to be solved before they are put into practical use. In particular, deterioration in the negative electrode is accompanied with the growth of needle-like lithium metal called dendrite, and the dendrite eventually penetrates through a separator while charging and discharging are repeated. This gives rise to a short circuit inside the battery, or triggers an explosion of the battery in some cases. The rechargeable batterie therefore also have a safety problem.

To solve the problems discussed above, a battery using a carbon material, such as graphite, as a negative electrode and lithium-containing metal oxide, such as $LiCoO_2$, as a positive electrode has been proposed. This battery is a so-called rocking-chair battery in which, after the battery is fabricated, lithium ions are supplied to the negative electrode from the lithium-containing metal oxide forming the positive electrode by charging, and further, lithium ions are returned to the positive electrode from the negative electrode by discharging. It is called a lithium-ion rechargeable battery because no metal lithium is used in the negative electrode and lithium ions alone are involved in charging and discharging, and is therefore distinguished from a lithium battery that uses metallic lithium. This battery is characterized by having a high voltage and a high capacity.

As the environmental problems are coming to the fore in recent years, active developments are under way for a clean energy storage system by photovoltaic power generation and wind power generation, a distributed power source aiming at achieving load-leveling of power, a power supply (main power supply and auxiliary power supply) for an electric vehicle or a hybrid electric vehicle as an alternative to a gasoline-powered vehicle.

A lead-acid battery has been used as a power source for electric equipment in the vehicle. However, today's vehicles are fully-equipped with power windows and IT-related devices, and there has been a need for a new power source having high energy density and output density for such equipment.

As such an electrical storage device or a driving power source, the lithium-ion rechargeable battery as described above and an electric double layer capacitor are receiving attention. The lithium-ion battery has indeed a high energy density; however, it has problems in an output characteristic, safety, and a cycle life.

On the other hand, an electric double layer capacitor is an electronic component that is used extensively as a memory backup power source for an IC and an LSI. Although a discharge capacity per charge is smaller than a battery, it has excellent instantaneous charge and discharge characteristics and endures several tens of thousands or more charge and discharge cycles. These high power and maintenance-free characteristics that are lacking in the lithium-ion battery and the nickel metal hydride battery.

The electric double layer capacitor has advantages as above; however, an energy density of a typical electric double layer capacitor is about 3 to 4 Wh/l, which is about two orders of magnitude smaller than that of the lithium-ion battery. Hence, it has not reached practical levels to be used as a driving power source to which a high energy density is required, for example, as the one used in the electric vehicle. For the electric double layer capacitor to be used in an electric vehicle, an energy density of 6 to 10 Wh/l is said to be required for practical use and 20 Wh/l for widespread use.

Recently, an electrical storage device called a hybrid capacitor has receiving attention as an electrical storage device applicable in a case where a high energy density and a high output characteristic are required.

Regarding the hybrid capacitor, an electric double layer capacitor is proposed, where a carbon material which is capable of absorbing and desorbing lithium ions and has preliminarily absorbed lithium ions either chemically or electrochemically is used as a negative electrode (for example, see JP-A-8-107048, page 2, second column, line 38 to page 2, second column, line 47).

Another electric double layer capacitor having an upper limit voltage of 4 V is proposed, in which, as a the negative electrode, a carbon material which is capable of absorbing and desorbing lithium ions is supported on a porous current collector that will not produce alloy with lithium metal (for example, see JP-A-9-55342, page 7, eleventh column, line 24 to page 7, eleventh column, line 28).

Further, another electric double layer capacitor is proposed, in which a polarizable electrode material containing activated carbon powder is combined in a mixed state with a current collector made of stainless steel fibers and used as a positive electrode, and a carbon material which is capable of absorbing and desorbing lithium ions and has preliminarily absorbed lithium ions either chemically or electrochemically is combined with a current collector made of porous metal or fibrous metal and used as the negative electrode (for example, see JP-A-9-232190, page 4, sixth column, line 1 to page 4, sixth column, line 10).

Still another electric double layer capacitor is proposed, in which a positive electrode is a polarizable electrode made of a carbonaceous material having self-potential in a range from 0.5 V to 2.6 V against Li/Li+as the counter electrode, and a negative electrode is made of at least one material selected from metallic lithium, alloy containing lithium metal, and a material which is capable of absorbing and desorbing lithium ions reversibly and has preliminarily absorbed lithium ions (for example, see JP-A-11-297578, page 3, fourth column, line 8 to page 3, fourth column, line 16).

According to these proposals, the negative electrode potential is lowered to improve the withstand voltage of the cell by having lithium ions supported preliminarily on the negative electrode. However, as with a coin battery, all have a cell configuration in which a pair of positive electrode and negative electrode is facing one another, and all fail to disclose a concrete example of a cylindrical battery having a wound electrode, or a large-scale cell, such as a prismatic battery, in which more than one electrode is laminated.

Methods for having lithium ions absorbed preliminarily on a negative electrode in a large-scale cell are disclosed. However, each method has an issue to be addressed toward industrialization, that is, it takes long time to have lithium ions supported uniformly (for example, see JP-A-8-162159, page 4, sixth column, line 10 to page 4, sixth column, line 45, JP-A-8-255633, page 4, fifth column, line 33 to page 5, seventh column, line 29, JP-A-10-144295, page 2, second column, line 4 to page 2, second column, line 34, or JP-A-8-102333, page 3, third column, line 2 to page 3, third column, line 37).

Meanwhile, an organic electrolyte battery has been proposed, in which each of a positive electrode current collector and a negative electrode current collector is provided with pores penetrating from the front surface to the back surface and a negative electrode active material is capable of reversibly supporting lithium ions, so that lithium ions derived from the negative electrode are supported on the negative electrode by electrochemical contact with a lithium electrode disposed oppositely to the negative electrode or the positive electrode (for example, see Japanese Patent Application No. 10-531811 (1998), page 11, line 4 to page 12, lien 27).

According to the invention disclosed therein, by providing the electrode current collector with pores penetrating from the front surface to the back surface, lithium ions are allowed to move through from the front surface to the back surface of the electrode without being blocked by the electrode current collector. Hence, even in an electrical storage device of the cell configuration having a number of laminated layers, it is possible to support lithium ions electrochemically not only on the negative electrode disposed near the lithium electrode but also on the negative electrode disposed apart from the lithium electrode.

Various materials capable of reversibly supporting lithium ions are used as a negative electrode active material. For example, it has been known to use various carbon materials, including graphite, such as natural graphite and artificial graphite, coke, pitch, heat-hardening resin, and those using coconut shells or trees as a starting material, as well as a carbon fiber, a polyacenic material, tin oxide, silicon oxide, etc. An insoluble, infusible substrate, which is a heat-treated product of aromatic condensation polymer of having a polyacenic skeleton structure having an atomic ratio of hydrogen atoms/carbon atoms in a rang of 0.50 to 0.05, can be suitably used as the negative electrode active material (see, for example, JP-B-1-44212, claims 1 through 22, or JP-B-3-24024, claims 1 through 8).

DISCLOSURE OF THE INVENTION

As has been described, the negative electrode made of a carbon material or the like which are capable of absorbing and desorbing lithium ions and which has supported lithium ions preliminarily has a lower potential than activated carbon used in the electric double layer capacitor. Hence, the withstand voltage of the cell is improved when combined with the positive electrode activated carbon, and an energy density becomes higher because the capacity of the negative electrode is far larger than that of the activated carbon.

However, discharge at a high current density has been difficult due to problems as follows: an electrolyte solution containing lithium ions has low conductivity and absorption and desorption reactions of lithium ions in the negative electrode are slow. In particular, it is thought that deterioration of the discharge characteristics is attributed to the fact that an internal resistance becomes larger in the discharged state than in the charged state.

An object of the invention is therefore to provide an organic electrolyte capacitor having a small change in internal resistance during charge and discharge as well as a high energy and a high output power.

The inventors conducted assiduous studies to solve the problems discussed above, and achieved the invention when they discovered that an organic electrolyte capacitor having a cell capacity X (mAh) in a charged state is discharged to half of a charging voltage over 1±0.25 hours, and having a full negative electrode capacity Y (mAh) that is a capacity when a negative electrode in the charged state is discharged to 1.5 V (Li/Li+), then, by controlling a ratio of a positive electrode active material to a negative electrode active material to be in the range $0.05 \leq X/Y \leq 0.3$, it is possible to achieve a high-performance organic electrolyte capacitor having a small internal resistance and a small change in internal resistance during charge and discharge as well as a high power density, in which lithium ions are allowed to move with ease.

That is to say, the invention is as follows.

(1) An organic electrolyte capacitor including a positive electrode, a negative electrode, and an electrolyte capable of transporting lithium ions, characterized in that:the positive electrode is able to support lithium ions and anions reversibly; the negative electrode is able to support the lithium ions reversibly; wherein the organic electrolyte capacitor having a cell capacity X (mAh) when in a charged state is discharged to half of a charging voltage over 1±0.25 hours, and having a full negative electrode capacity Y (mAh) that is a capacity when the negative electrode in the charged state is discharged to 1.5 V (Li/Li+), and wherein a ratio of a positive electrode active material to a negative electrode active material being controlled to be within a range $0.05 \leq X/Y \leq 0.3$.

(2) The organic electrolyte capacitor according to (1), wherein the lithium ions have been preliminarily supported on the negative electrode and/or the positive electrode.

(3) The organic electrolyte capacitor according to (1) or (2), wherein an capacitance per unit weight of the negative electrode active material is three times or more an capacitance per unit weight of the positive electrode active material, and a weight of the positive electrode active material is larger than a weight of the negative electrode active material.

(4) The organic electrolyte capacitor according to any of (1) through (3), further including a positive electrode current collector and a negative electrode current collector, wherein each current collector is provided with pores penetrating from the front surface to the back surface, and the lithium ions are supported on the negative electrode and/or the positive electrode by an electrochemical contact with a lithium electrode facing the negative electrode and/or the positive electrode.

The reason why "a ratio of a positive electrode active material and a negative electrode active material is controlled to satisfy $0.05 \leq X/Y \leq 0.3$" is because it is essentially necessary to set a negative electrode capacity (herein, equivalent to the cell capacity X arbitrarily with respect to the lithium ion releasing ability of the negative electrode (herein, the full negative electrode capacity Y) in order to control the output characteristic of the cell.

In other words, the inventors discovered that a ratio of the cell capacity X as against the full negative electrode capacity Y X/Y is determined by a ratio of the positive electrode active material and the negative electrode active material, and X/Y becomes larger as the ratio of the positive electrode active material increases, and X/Y becomes smaller as the ratio of the positive electrode active material decreases. Further, the inventors found that the value of X/Y gives influences to the output characteristic of the cell, and thereby discovered that a high output characteristic can be achieved in the range, $0.05 \leqq X/Y \leqq 0.3$.

The reason why "a capacitance per unit weight of the negative electrode active material is three times or more a capacitance per unit weight of the positive electrode active material, and a weight of the positive electrode active material is larger than a weight of the negative electrode active material" is because the energy density varies by changing the ratio of the weight of the positive electrode active material and the weight of the negative electrode active material even when the discharge capacity of the cell is constant. In other words, the energy density is increased by lowering the ratio of the weight of the negative electrode active material having a capacitance per unit weight, and conversely, the energy density is reduced by increasing the proportion of the weight of the negative electrode active material.

EFFECTS OF THE INVENTION

As has been described, the organic electrolyte capacitor of the invention includes a positive electrode, a negative electrode, and an electrolyte capable of transporting lithium ions. The positive electrode is able to support lithium ions and anions reversibly, and the negative electrode is able to support the lithium ions reversibly. The organic electrolyte capacitor having a cell capacitor X (mAh) when in a charged state is discharged to half of a charging voltage over 1±0.25 hours, and having a full negative electrode capacity Y (mAh) that is a capacity when the negative electrode in the charged state is discharged to 1.5 V (Li/Li+), then, by controlling a ratio of a positive electrode active material to a negative electrode active material to be within a range $0.05 \leqq X/Y \leqq 0.3$, it is possible to achieve an organic electrolyte capacitor having a high voltage and a high energy density and yet a high output power characteristic.

Because internal resistance of the cell varies with the thickness of the electrode and so on, the absolute value of the output power characteristic varies. However, in the examples of this application, 50% or more of the cell capacity which is obtained when the cell is discharged at a current at which the discharge time is 1±0.25 hours, can be retained when the cell is discharged at a current as high as 100 times. Among others, a case where a capacitance per unit weight of the negative electrode active material is three times or more a capacitance per unit weight of the positive electrode active material, and a weight of the positive electrode active material is larger than a weight of the negative electrode active material as in Example 3 is particularly suitable, the energy density can be increased.

The organic electrolyte capacitor of the invention having the characteristics as described above is quite effective as a driving storage power source or an auxiliary storage power source for an electric vehicle, a hybrid electric vehicle, and a fuel cell vehicle. It is also used suitably for a driving storage power source or an auxiliary storage power source for an electric bicycle, an electric scooter, and an electric wheelchair. Further, the capacitor can be used suitably as various energy storage devices, such as storage device of solar energy and a storage device for wind power generation. Alternatively, it can be suitably used as a storage power source for an uninterruptible power supply and household electric appliance.

BRIEF DESCRIPTION OF THE DRAWINGS

FIG. 5 is an enlarged plan view of an electrode current collector (positive electrode current collector 1a or negative electrode current collector 2a) on which electrode is formed, and FIG. 5 shows an example where expanded metal is used as the electrode current collector and portions encircled by a dotted line are through-pores.

FIG. 6 is a cross section taken along the line I-I' of FIG. 5, and FIG. 6 shows that the through-pores in the expanded metal (positive electrode current collector 1a and negative electrode current collector 2a) are filled in with conductive materials 1b and 2b and positive electrodes 1 and negative electrodes 2 are formed on conductive layers on the expanded metal in which the through-pores are filled in.

Figure 1:
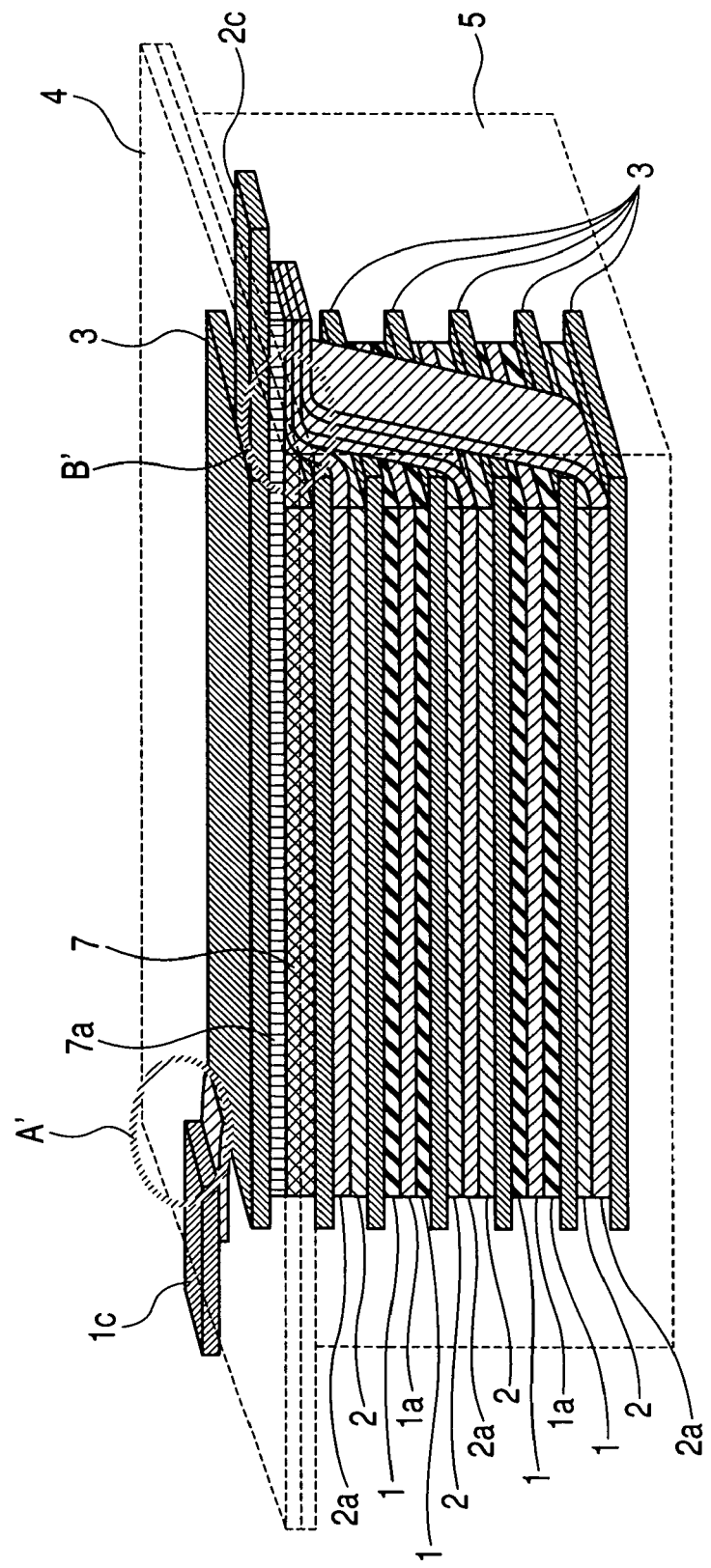
FIG. 1 is a perspective view showing the internal structure of an organic electrolyte capacitor when laminate films are used as an outer container, in which the internal structure of the organic electrolyte capacitor is indicated by a solid line and the outer container of the organic electrolyte capacitor is indicted by a dotted line.

Reference numerals labeled in the respective drawings will now be described. Numeral 1 denotes a positive electrode; alpha-numeral 1a denotes a positive electrode current collector; alpha-numeral 1c denotes a positive electrode terminal; numeral 2 denotes a negative electrode; alpha-numeral 2a denotes a negative electrode current collector; alpha-numeral 2c denotes a negative electrode terminal; numeral 3 denotes a separator; numerals 4 and 5 denote laminated films; numeral 6 denotes an electrode laminated unit; numeral 7 denotes a lithium electrode; alpha-numeral 7a denotes a lithium electrode current collector; numeral 8 denotes a three-electrode laminated unit; alpha-numerals 9a and 9b denote conducting wires A and B; capital C denotes a heat seal portion; a capital A' denotes a terminal connection portion; and a capital B' denotes a terminal welding portion.

BEST MODE FOR CARRYING OUT THE INVENTION

An organic electrolyte capacitor of the invention is an organic electrolyte capacitor including a positive electrode, a negative electrode, and an electrolyte capable of transporting lithium ions, characterized in that: the positive electrode is able to support lithium ions and anions reversibly; the negative electrode is able to support the lithium ions reversibly; wherein the organic electrolyte capacitor having a cell capacity X (mAh) when in a charged state is discharged to half of a charging voltage over 1±0.25 hours, and having a full negative electrode capacity Y (mAh) when the negative electrode in the charged state is discharged to 1.5 V (Li/Li+), and wherein a ratio of a positive electrode active material to a negative electrode active material being controlled to be within a range $0.05 \leq X/Y \leq 0.30$.

In the invention, it is preferable that lithium ions have been preliminarily supported on the negative electrode and/or the positive electrode. Also, positive and negative electrode current collectors are provided with pores penetrating from the front surface to the back surface, and a method for supporting lithium ions on the negative electrode and/or the positive electrode by an electrochemical contact with a lithium electrode disposed oppositely to the negative electrode and/or the positive electrode is most appropriate from the industrial view point.

Figure 2:
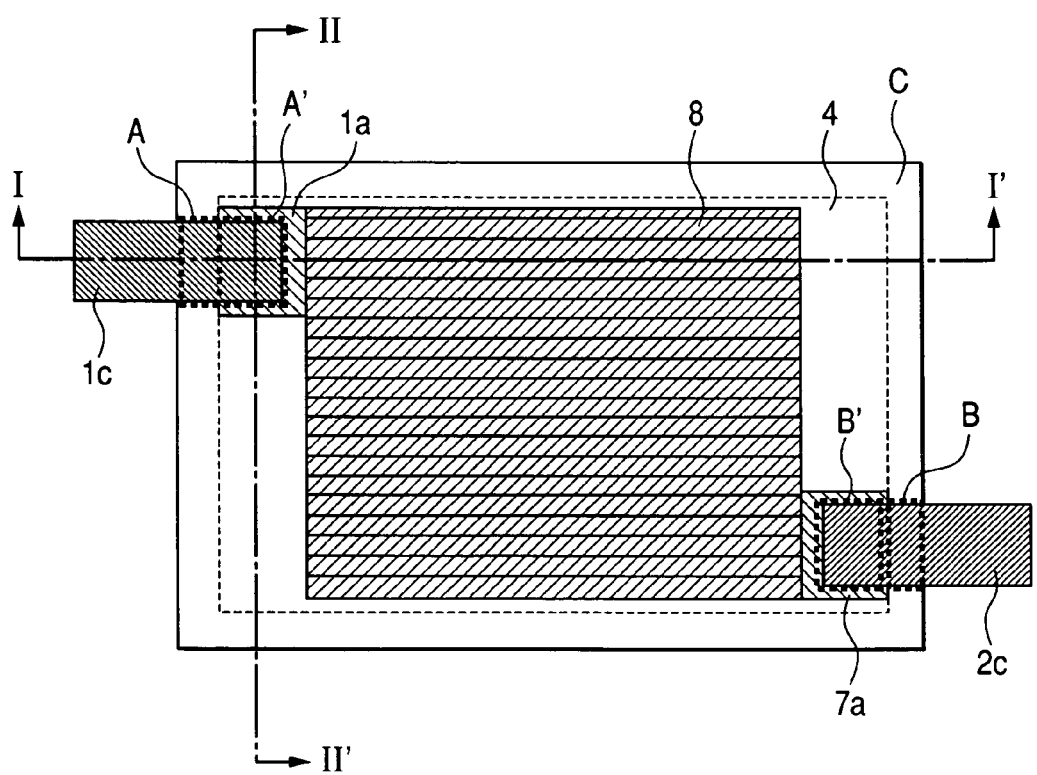
FIG. 2 is a plan view of FIG. 1.
Figure 3:
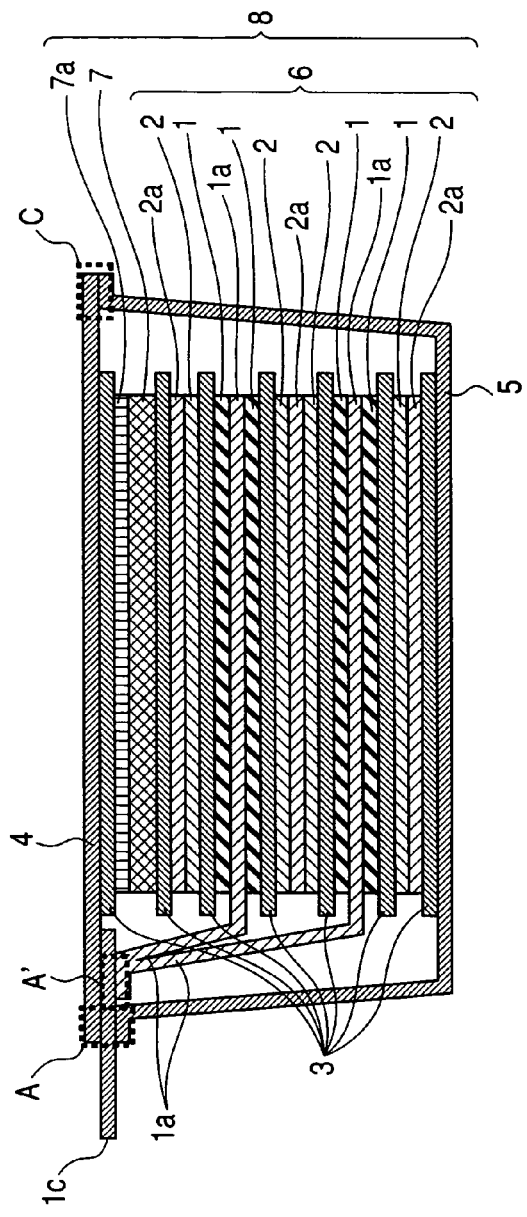
FIG. 3 is a cross section taken along the line I-I' of FIG. 2.
Figure 4:
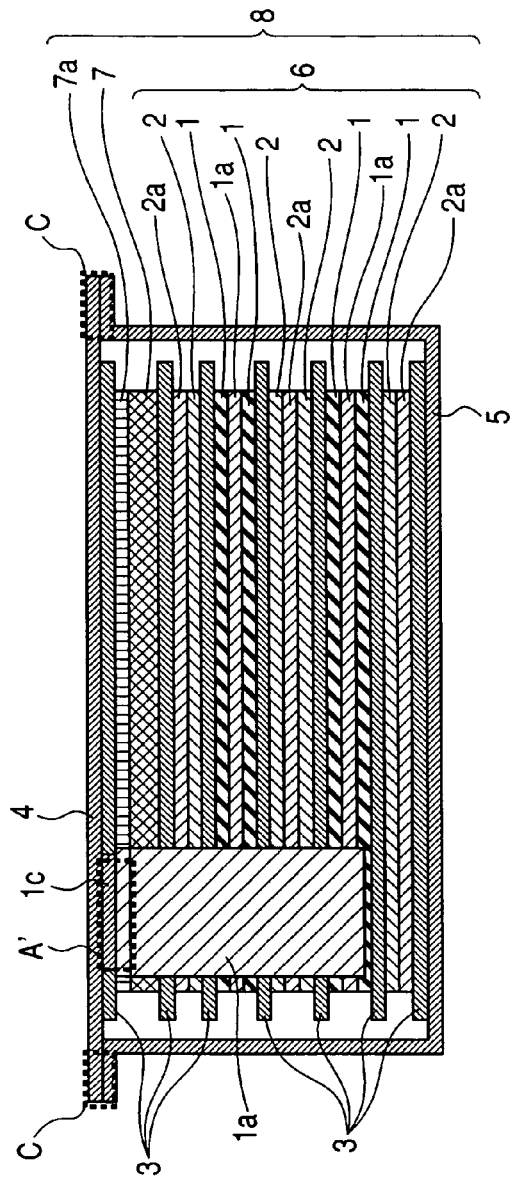
FIG. 4 is a cross section taken along the line II-II' of FIG. 2.
Figure 7A:
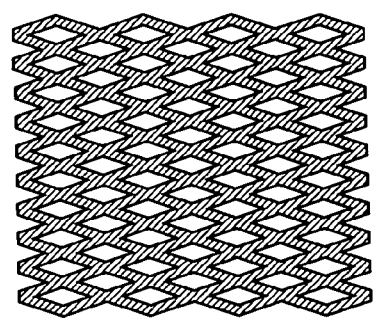
FIG. 7(a) shows an example of expanded metal having a porosity of 38%.
Figure 7B:
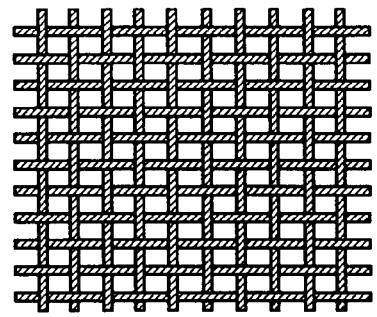
FIG. 7(b) shows an example of a metal net having a porosity of 37%.
Figure 7C:
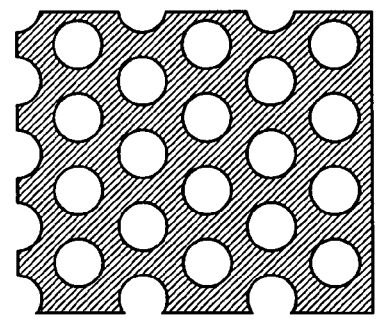
FIG. 7(c) shows an example of punched metal having a porosity of 34%; although through-pores in the electrode current collector are of a circular shape in the example of FIG. 7(c), the shape of the through-pores is not limited to a circular shape, and various shapes, for example, a rectangular shape (porosity: 45%) as shown in FIG. 7(d), a cross shape (porosity: 35%) as shown in FIG. 7(e), etc. can be set arbitrarily.
Figure 7D:
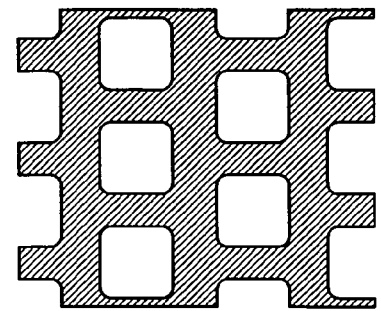
FIG. 7 shows examples of the electrode current collector.
Figure 7E:
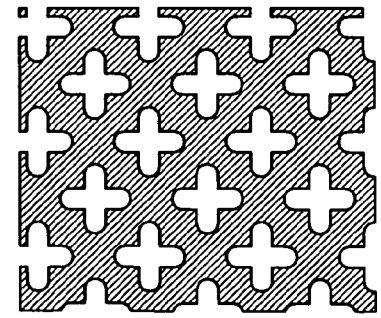

The internal structure of the organic electrolyte capacitor of the invention will be described first. FIG. 1 is a perspective view showing the internal structure of the organic electrolyte capacitor of the invention as an example when laminated films are used as an outer container. Referring to FIG. 1, the internal structure of the organic electrolyte capacitor is indicated by a solid line, and the outer container of the organic electrolyte capacitor is indicated by a dotted line. FIG. 2 is a plan view of FIG. 1. FIG. 3 is a cross section taken along the line I-I' of FIG. 2, and FIG. 4 is a cross section taken along the line II-II' of FIG. 2.

The organic electrolyte capacitor of the invention shown in FIG. 1 is formed by providing a three-electrode laminated unit comprising a lamination of positive electrodes 1, negative electrodes 2, and a lithium electrode 7 inside the laminated films, and sealing two laminate films 4 and 5 by means of heat seal or the like after the interior is filled with an electrolyte solution capable of transporting lithium ions. In the invention, "positive electrode" means an electrode on the side from which a current flows out during discharging and into which a current flows during charging, and "negative electrode" means an electrode on the side into which a current flows during discharging and from which a current flows out during charging.

As is shown in FIG. 1, the positive electrode 1 formed on a positive electrode current collector 1*a* and the negative electrode 2 formed on a negative electrode current collector 2*a* are laminated via a separator 3 so that they will not come into direct contact with each other. An electrode laminated unit 6 is thus formed. The lithium electrode 7 formed by laminating lithium metal to one surface of a lithium electrode current collector 7*a* by means of pressure bonding is provided on the top of the electrode laminated unit 6 via the separator 3. A three-electrode laminated unit is thus formed.

As an example of the invention, each of the electrode current collector (positive electrode current collectors 1*a* and negative electrode collectors 2*a*) and the lithium electrode current collector 7*a* are provided with pores penetrating through from the front surface to the back surface (not shown in FIG. 1). Even when these through-pores are filled in with a conductive material, lithium ions are allowed to move freely from electrode to electrode by passing through the through-pores portions which filled in with the conductive material.

FIG. 5 is an enlarged plan view of the electrode collector (positive electrode current collector 1*a* or negative electrode current collector 2*a*) on which the electrode is formed. FIG. 5 shows an example where expanded metal is used as the electrode current collector, and portions encircled by a dotted line are the through-holes. FIG. 6 shows a cross section taken along the line I-I' of FIG. 5. As is shown in FIG. 6, the through-pores in the expanded metal (positive electrode current collectors 1*a* and negative electrode current collectors 2*a*) are filled in with conductive materials 1*b* and 2*b*. The positive electrode 1 and the negative electrode 2 are formed on the conductive layers on the expanded metal in which the through-pores are filled in.

When the battery is fabricated, all the negative electrodes 2 are brought into contact with the lithium electrode 7 electrochemically upon the electrolyte solution is injected. Lithium ions dissolved into the electrolyte solution from the lithium electrode 7 are then supported on all the negative electrodes 2 smoothly through the through-pores in the lithium electrode current collector 7*a*, the positive electrode current collectors 1*a*, and the negative electrode current collectors 2*a*.

Referring to FIG. 3, the electrode laminated unit 6 has four layers of positive electrodes 1 and four layers of negative electrodes 2; however, the structure of the electrode laminated unit is not particularly limited, and the numbers of the positive electrodes and the negative electrodes are not particularly limited as long as at least one layer of the positive electrode and one layer of the negative electrode are provided.

The lithium electrode 7 is provided to supply lithium ions to the negative electrodes 2. Hence, a quantity enough to obtain as target negative electrode capacitance is sufficient. Also, an effect can be obtained by supplying lithium ions to the positive electrode instead of the negative electrode, or to both the positive electrode and the negative electrode. However, it is preferable to adjust an adequate quantity by taking the lithium ion absorbing abilities of the positive electrode and the negative electrode, safety, etc. into account.

The lithium electrode 7 is provided to supply lithium ions to the negative electrodes 2 with lithium ions. Hence, a quantity enough to obtain as target negative electrode capacitance is sufficient. Also, an effect can be obtained by supplying lithium ions to the positive electrode instead of the negative electrode, or to both the positive electrode and the negative electrode. However, it is preferable to adjust an adequate quantity by taking the lithium ion absorbing abilities of the positive electrode and the negative electrode, safety, etc. into account.

The lithium electrode 7 is gradually reduces as it releases lithium ions. Hence, it is preferable to use a conductive porous body, such as a stainless steel mesh, as the lithium electrode current collector 7*a*, so that the lithium electrode 7 is disposed by filling at least part of the lithium electrode 7 in a pore portion of the lithium electrode current collector. When configured in this manner, even when lithium ions from the lithium electrode 7 are deposited on the electrode, a gap to be produced between the electrodes due to the loss of the lithium electrode can be smaller, and lithium ions are supported smoothly on the electrode active material.

In the organic electrolyte capacitor of the invention shown in FIG. 1, the separators 3 are provided between the respective electrodes so that the positive electrodes 1, the negative electrodes 2, and the lithium electrode 7 will not come into direct contact. The interior of the cell is filled with the electrolyte capable of transporting lithium ions, and the separators 3 that partition the respective electrodes are impregnated with the electrolyte. The electrolyte is normally dissolved in a solvent and used in the form of liquid and impregnated in the separators 3. In a case where the separators 3 are not used, the electrolyte may be used in the form of gel or solid to prevent the positive electrodes 1 and the negative electrodes 2 from coming into direct contact and to prevent leakage of the electrolyte.

As is shown in FIG. 2, each positive electrode current collector 1a has an extended portion that serves as a terminal connection portion A', and terminal welding portions A' (two) of each positive electrode current collector 1a are welded to a positive electrode terminal 1c. Also, each negative electrode current collector 2a and the lithium electrode current collector 7a have an extended portion that serves as a terminal connection portion B'. Terminal welding portions B' (three) of each negative electrode current collector 2a and a terminal welding portion B' (one) of the lithium electrode current collector 7a are bundled together in a group and welded to a negative electrode terminal 2c.

The laminated films 4 and 5 are sealed while the positive electrode terminal 1c and the negative electrode terminal 2c are pinched in between. The positive electrode terminal 1c and the negative electrode terminal 2c are heat sealed to the laminated films 4 and 5 at heat seal portions A and B, respectively, shown in FIG. 2. In other words, in the case of FIG. 2, the organic electrolyte capacitor is sealed at the heat seal portions A and B of the laminated films 4 and 5 and the respective terminals and at the heat seal portions C of the laminated films 4 and 5. The positive electrode terminal 1c and the negative electrode terminal 2c thus protrude to the outside of the battery from a space between the laminated films 4 and 5. Hence, the positive electrodes 1 are in a connectable state to an external circuit via the positive electrode terminal 1c and the negative electrodes 2 and the lithium electrode 7 are in a connectable state to an external circuit via the negative electrode terminal 2c.

The shape and the size of the positive electrode terminal 1c and the negative electrode terminal 2c are not particularly limited. However, because resistance of the terminals can be smaller, they are preferably as thick as and as wide as possible to the extent that satisfactory airtightness can be achieved in a limited cell volume. It is preferable to choose the shape and the size of the respective terminals to suit the desired characteristics of the cell.

Hereinafter, the organic electrolyte capacitor of the invention will be described in detail regarding (A) positive electrode current collector and negative electrode current collector, (B) conductive material, (C) negative electrode, (D) positive electrode, (E) lithium electrode, (F) electrolyte, (G) outer container, (H) principle of organic electrolyte capacitor, and (I) manufacturing method of organic electrolyte capacitor, in this order.

(A) Positive Electrode Current Collector and Negative Electrode Current Collector Various materials generally proposed for use in an organic electrolyte battery can be used as the positive electrode current collector and the negative electrode current collector. As the positive electrode current collector, aluminum, stainless steel, etc. can be used suitably, and as the negative electrode current collector, stainless steel, copper, nickel, etc. can be used suitably. Materials of various shapes, such as foil-shaped and net-shaped materials, can be used. In particular, in order to have lithium ions supported preliminarily on the negative electrode and/or the positive electrode, those provided with pores penetrating through from the front surface to the back surface are preferred, and examples include expanded metal, punched metal, a metal net, a foam, a porous foil provided with through-holes by means of etching, etc. It is preferable to form a conductive layer on the current collector, because the internal resistance can be reduced.

More preferably, by filling in at least part of the through-pores in the electrode current collector with a conductive material that does not readily detach before the electrode is formed, not only is it possible to enhance the productivity of the electrodes, but it is also possible to solve the problem that the reliability of the capacitor is deteriorated due to the detachment of the electrodes. Further, a high energy density and a high output power density can be achieved by making the electrode including the current collector thinner.

Regarding the thickness of the electrode current collector, the positive electrode and the negative electrode can be of the same thickness. However, when the materials are different, the effect of reducing the weight per cell volume is large by making whichever electrode that has the greater specific gravity thinner. In the invention, when aluminum is used as the positive electrode current collector and copper is used as the negative electrode current collector, it is more preferable to make the negative electrode current collector thinner than the positive electrode current collector.

The shape and number of the through-pores in the electrode current collector can be set as needed, so that lithium ions in the electrolyte solution described below are allowed to move through from the front surface to the back c surface of the electrode without being blocked by the electrode current collector and the through-pores are readily filled in with the conductive material.

The porosity of the electrode current collector can be defined as a ratio, {1−(weight of collector/absolute specific gravity of collector)/(apparent volume of collector)} on a percentage basis. The porosity of the electrode collector used in the invention is normally 10 to 79%, preferably 20 to 60%, more preferably 30 to 50%, and most preferably 35 to 45%.

When the porosity of the electrode current collector is high, the time needed to support lithium ions on the negative electrode can be shorter and irregularities hardly result in supported lithium ions. However, the strength of the current collector is deteriorated and wrinkles and breaking readily occur. Also, it becomes difficult to hold the conductive material on the through-pores, which raises problems that the electrode manufacturing yield is reduced due to the detachment of the conductive material and the breaking in the electrodes, etc.

On the other hand, when the porosity is low, the time needed to support lithium ions on the negative electrode is extended, which raises problems, for example, the production efficiency is deteriorated, irregularities of the cell characteristic are increased, etc. However, the strength of the current collector is increased and the active material will hardly detach, which can in turn improve the electrode yield. It is thus preferable to choose the porosity and the pore diameter of the electrode current collector within the range specified above by taking the structure (laminated type or winding type) of the battery and the productivity into account.

FIG. 7 shows examples of the electrode current collector. FIG. 7(a) shows an example of expanded metal having a porosity of 38%. FIG. 7(b) shows an example of a metal net having a porosity of 37%. FIG. 7(c) shows an example of punched metal having a porosity of 34%. The example in FIG. 7(c) shows an example where the through-pores in the electrode current collector are of a circular shape; however, the shape of the through-pores is not limited to a circular shape. The shape can be set arbitrarily, and it can be, for example, of a rectangular shape (porosity: 45%) as is shown in FIG. 7(d), of a cross shape (porosity: 35%) as is shown in FIG. 7(e), etc.

(B) Conductive Material

Conductive materials coated on the surface of the electrode current collector described above can be any material that hardly detach from the through-pores and allows lithium ions to move by penetrating through the conductive material even when the through-pores are filled in, and other properties are not particularly limited.

Such conductive materials are chiefly made of a conductive member and binder resin. The kinds, composition, etc. of the conductive member and the binder resin can be set as needed.

Examples of the conductive member used for such conductive materials include, for example, various carbon materials including graphite, such as natural graphite or artificial graphite, and those based on coke, pitch, resin, and plants, all of which can be used as the negative electrode active material described below, as well as carbon blacks, such as acetylene black and ketjen black, a polyacenic material, tin oxide, silicon oxide, etc. Also, metal powder of metal nickel or the like can be used. Of these, particularly preferable conductive members are graphite, acetylene black, ketjen black, etc.

The binder resin used as the conductive material can be any resin that is insoluble in the organic electrolyte solution described below. For example, aqueous resin using water as a dispersion medium or a solvent, non-aqueous resin using an organic solvent, such as alcohol and N-methylpyrrolidone, as a dispersion medium or a solvent, can be used. For example, rubber binder resin, such as SBR, and carboxymethyl cellulose resin are aqueous resin, and phenol resin and melamine resin can be used as either aqueous resin or non-aqueous resin depending on the compositions.

Also, acrylic resin, polyamide resin, and polyethylene resin in the emulsion form can be used as aqueous resin. Meanwhile, fluoride-containing resin, such as polytetrafluoroethylene and poly(vinylidene fluoride), polyimide resin, polyamide imide copolymer resin are representative examples of the non-aqueous resin. Of these, it is particularly preferable to use non-aqueous polyamideimide resin, because the conductive material closely adheres to the electrode current collector and therefore hardly detaches from the through-pores. Also, by forming an electrode layer using an aqueous binder described below on the conductive layer with the non-aqueous binder, it is possible to obtain the electrode having satisfactory coating property and bonding property of the electrode layer as well as excellent homogeneity and reliability.

(C) Negative Electrode

In the organic electrolyte capacitor of the invention, the negative electrode contains a negative electrode active material capable of reversibly supporting lithium ions. The negative electrode active material layer in the invention is molded by adding the conductive member, the binder resin, etc. to the negative electrode active material as needed.

The negative electrode active material used in the invention is not particularly limited as long as it is able to support lithium ions reversibly. For example, various carbon materials including graphite, such as natural graphite and artificial graphite, coke, pitch, heat-curable resin, and those using coconut shells, trees, etc. as a staring material, as well as a carbon fiber, a polyacenic material, thin oxide, silicon oxide, etc. can be used.

Because lithium ion has a small ion diameter, it is particularly preferable as the negative electrode active material that the materials described above are processed such as carbonization and treatment under particular conditions to control the structure in order to transport lithium ions efficiently.

Among others, a polyacenic organic semiconductor (PAS) is particularly suitable as the negative electrode active material, because it undergoes no structural change, such as swelling and contraction, in response to intercalation and desorption of lithium ions due to its amorphous structure, and therefore has an excellent cycle characteristic. Also, because it has an isotropic molecular structure (high-order structure) in response to insertion and desorption of lithium ions, it has an excellent characteristic for quick charge and quick discharge. In the invention, it is preferable to use an insoluble, infusible substrate which is a heat-treated product of aromatic condensation polymer carrying the polyacenic skeleton structure with an atomic ratio of hydrogen atoms/carbon atoms of 0.50 to 0.05.

The aromatic condensation polymer referred to herein means a condensation product of an aromatic hydrocarbon compound and aldehydes. As the aromatic hydrocarbon compound, for example, so-called phenols, such as phenol, cresol, and xylenol, can be used suitably.

Also, as the aromatic condensation polymer, aromatic condensation polymer, in which part of the aromatic hydrocarbon compound having the phenolic hydroxyl group as described above is substituted by an aromatic hydrocarbon compound having no phenolic hydroxyl group, for example, xylene, toluene, and aniline, to be more specific, a condensation product of phenol, xylene, and formaldehyde can be used. Further, aromatic polymer substituted by melamine and urea can be used, and furan resin can be also used suitably.

As the aldehydes described above, aldehyde, such as formaldehyde, acetaldehyde, and furfural, can be used. Of these, formaldehyde is most suitable. The phenol formaldehyde condensation product may be either a novolac type or a resole type, or a mixture thereof.

The insoluble, infusible substrate can be obtained by subjecting the aromatic polymer to heat treatment, and an insoluble, infusible substrate of the polyacenic skeleton structure as described above can be used.

Regarding the insoluble, infusible substrate used in the invention, the position of the main peak is indicated by $2\theta$ and it is present at $24°$ or below according to the X ray diffraction (CuK$\alpha$), and another broad peak is present at a position between 41 and $46°$ in addition to the main peak. In other words, it is suggested that the insoluble, infusible substrate has the polyacenic skeleton structure in which the aromatic polycyclic structure is developed appropriately and indicates that it forms the amorphous structure, which enables lithium ions to be doped in a stable manner. The insoluble, infusible substrate is therefore useful as the active material for the organic electrolyte capacitor of the invention.

Conductive members, including carbon-based materials, such as acetylene black, ketjen black, and graphite, and metal powder, can be added to the negative electrode active material as needed.

It is preferable that the negative electrode active material layer of the invention contains the negative electrode active material, such as the carbon materials as described above and PAS, and is molded using the negative electrode active material of a shape that can be easily molded, for example, in the form of powder, grains, or short fibers, with the binder resin. The binder resin can be any binder that is insoluble in the organic electrolyte solution described below. For example, aqueous resin using water as a dispersion medium or a solvent, non-aqueous resin using an organic solvent, such as alcohol and N-methylpyrrolidone, as a dispersion medium or a solvent, can be used. For example, rubber binder resin, such as SBR, and carboxymethyl cellulose resin are aqueous resin, and phenol resin and melamine resin can be used as either aqueous resin or non-aqueous resin depending on the compositions.

Also, acrylic resin, polyamide resin, and polyethylene resin in the emulsion form can be used as aqueous resin. Meanwhile, fluoride-containing resin, such as polytetrafluoroethylene and poly(vinylidene fluoride), polyimide resin, and polyamide imide copolymer resin are representative examples of the non-aqueous resin.

Of these, it is particularly preferable to use fluoride resin, aqueous SBR resin, acrylic resin, and non-aqueous fluoride resin.

The thickness of the negative electrode active material layer is designed to keep balance with the thickness of the positive electrode active material layer to ensure the energy density of the cell. By making the negative electrode active material layer thinner, the active material can be used more effectively, which can in turn enhance the power density. On the other hand, it is not preferable to make the active material layer too thin, because the energy density of the cell is deteriorated. Hence, by taking the industrial productivity into account, the thickness of the negative electrode active material layer of the invention is normally 15 to 100 μm and preferably 20 to 80 μm on one side.

A mixing ratio of the binder resin is 1 to 20%, more preferably 2 to 10%, and most preferably 2 to 5% on the basis of the weight of the active material.

(D) Positive Electrode

In the organic electrolyte capacitor of the invention, the positive electrode contains a positive electrode active material capable of reversibly supporting lithium ions and/or anions, for example, tetrafluoroborate.

The positive electrode active material is not particularly limited as long as it is a material capable of reversibly supporting lithium ions and/or anions. For example, various activated carbons using coke, pitch, resin, coconut shell, and plants such as sawdust, as the starting material and activated with water vapor, carbon dioxide, or potassium hydroxide, conductive polymer, a polyacenic material, mesopore carbon in which mesopores having the pore diameter of 2.0 to 50 nm are noticeably developed, etc., can be used.

The positive electrode active material layer of the invention is molded by adding the conductive member, the binder resin, etc. to the positive electrode active material as needed. The kinds, compositions, etc. of the conductive member and the binder resin can be set as needed.

As the conductive member, for example, carbon blacks, such as activated carbon, acetylene black, and ketjen black, carbon-based materials, such as graphite, can be used suitably. A mixing ratio of the conductive members differs with the electric conductivity of the active materials, the shape of the electrode, etc; however, it is preferable to add the conductive member at a ratio of 2 to 40% with respect to the active material.

The binder resin can be any binder that is insoluble in the organic electrolyte solution described below. For example, aqueous resin using water as a dispersion medium or a solvent, non-aqueous resin using an organic solvent, such as alcohol and N-methylpyrrolidone, as a dispersion medium or a solvent, can be used. For example, rubber binder resin, such as SBR, and carboxymethyl cellulose resin are aqueous resin, and phenol resin and melamine resin can be used as either aqueous resin or non-aqueous resin depending on the compositions.

Also, acrylic resin, polyamide resin, and polyethylene resin in the emulsion form can be used as aqueous resin. Meanwhile, fluoride-containing resin, such as polytetrafluoroethylene and poly(vinylidene fluoride), polyimide resin, and polyamide-imide copolymer resin are representative examples of the non-aqueous resin of these, it is particularly preferable to use fluoride resin, aqueous SBR resin, acrylic resin, and non-aqueous fluoride resin.

A mixing ratio of the binder resin is 1 to 20%, preferably 2 to 10%, and most preferably 2 to 5% on the basis of the weight of the active material.

In the invention, the thickness of the positive electrode layer is normally 30 to 150 μm and preferably 60 to 100 μm on one side.

The thickness of the positive electrode active material layer is designed to keep balance with the thickness of the negative electrode active material layer to ensure the energy density of the cell. By making the positive electrode active material layer thinner, the active material can be used more effectively, which can in turn enhance the output density. On the other hand, it is not preferable to make the active material layer too thin, because the energy density of the cell is deteriorated. Hence, by taking the industrial productivity into account, the thickness of the positive electrode active material layer as specified above can be suitably used in the invention.

(E) Lithium Electrode

In one example of the organic electrolyte capacitor of the invention, the lithium electrode 7 is disposed preliminarily inside the organic electrolyte capacitor as the supply source of lithium ions. As the lithium electrode, lithium metal or a material containing at least lithium metal and capable of supplying lithium ions, such as lithium-aluminum alloy, is used.

A quantity enough to obtain a certain negative electrode capacitance is sufficient as a quantity of the lithium electrode (weight of a material capable of supplying lithium ions, such as lithium metal) disposed inside the organic electrolyte capacitor. When more than a sufficient quantity is disposed, after a certain quantity is supported on the electrode from the lithium electrode 7, the lithium electrode 7 may be left inside the organic electrolyte capacitor (the definition of the capacitance will be given below). It should be noted, however, that it is preferable to dispose only the necessary quantity and support a whole quantity on the negative electrode and/or the positive electrode in the view of safety.

In the invention, it is preferable to form the lithium electrode on the lithium electrode current collector made of a conductive porous body. However, the lithium electrode current collector may be omitted. It is preferable to use a metal porous body that does not react with the lithium electrode, such as a stainless steel mesh, as the conductive porous body that serves as the lithium electrode current collector.

When the conductive porous body, such as a stainless steel mesh, is used as the lithium electrode current collector, it is preferable that at least part of the lithium electrode is filled in the pore portion of the lithium electrode current collector. More preferably, the lithium electrode is disposed so that 80% or more of the lithium electrode is filled in the pore portion of the conductive porous body. When configured in this manner, even after lithium ions are deposited on the negative electrode, a gap to be produced between the electrodes due to the loss of the lithium electrode can be smaller. It is thus possible to maintain the reliability of the organic electrolyte capacitor in a more reliable manner.

Figure 8:
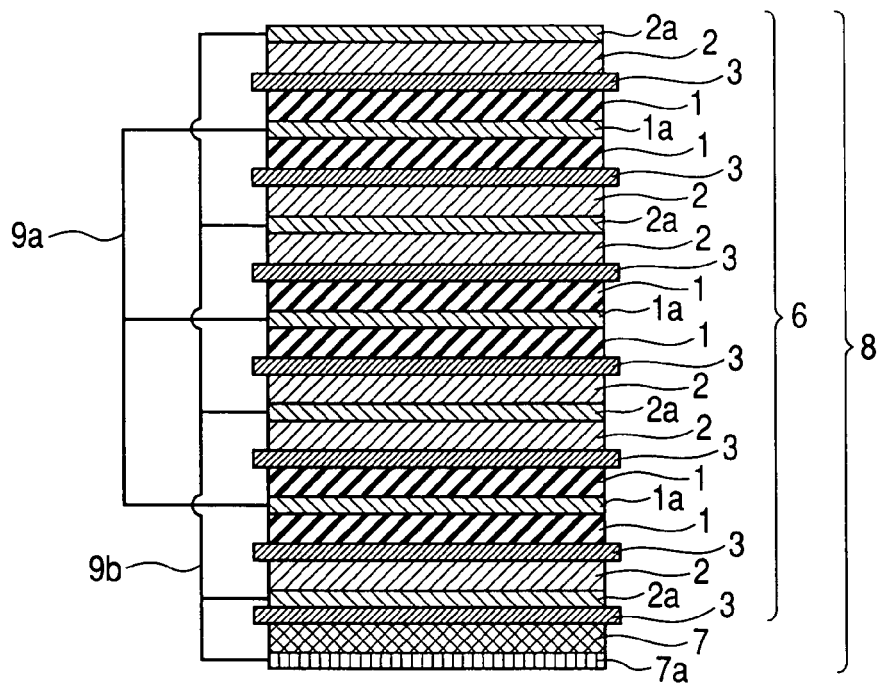
FIG. 8 is a cross section showing a first example of a layer configuration of a three-electrode laminated unit.
Figure 9:
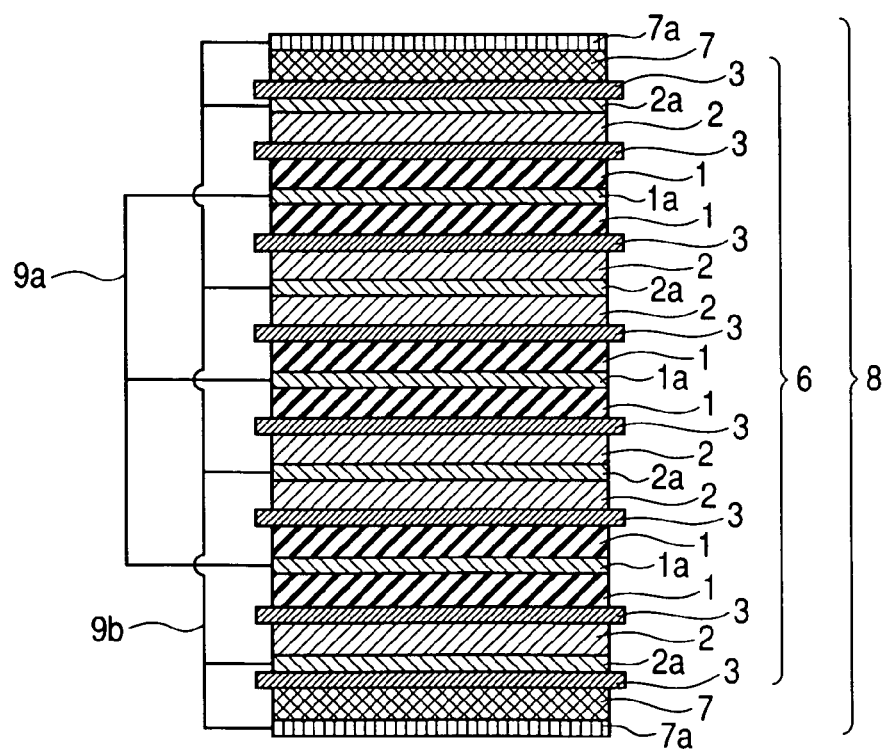
FIG. 9 is a cross section showing a second example of the layer configuration of the three-electrode laminated unit.
Figure 10:
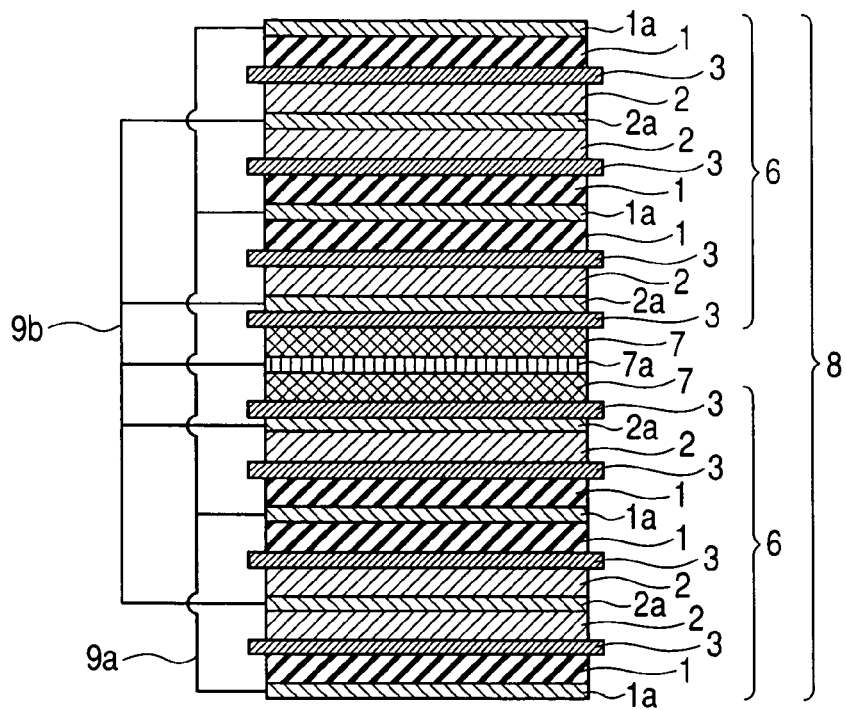
FIG. 10 is a cross section showing a third example of the layer configuration of the three-electrode laminated unit.

It is preferable to dispose the lithium electrode current collector, on which the lithium electrode is formed, oppositely to the negative electrode or the positive electrode. For example, referring to FIG. 8, the lithium electrode 7 made by pressure bonding lithium metal to the lithium electrode current collector 7a is disposed at the bottom of the electrode laminated unit 6 in which the positive electrodes 1, the separators 3, and the negative electrodes 2 are sequentially laminated to form the three-electrode laminated unit 8. FIG. 9 shows another layer configuration of the three-electrode lamination unit 8. Referring to FIG. 9, the lithium electrodes 7, each being made by pressure bonding lithium metal to the lithium electrode current collector 7a, are disposed at the top and bottom of the electrode laminated unit 6 to form the three-electrode laminated unit 8. In a further example shown in FIG. 10, the lithium electrodes 7 are disposed between the two-electrode laminated units 6 to form the three-electrode lamination unit 8. By disposing the lithium electrode(s) 7 in these manners, lithium ions can be supported smoothly on the negative electrodes.

The lithium electrode current collector, on which the lithium electrode is formed, may be disposed in the cross sectional direction of the electrode laminated unit, so that lithium ions are supported on the negative electrode active material and/or the positive electrode active material by short circuiting the negative electrode terminal and/or the positive electrode terminal with the lithium electrode terminal. In this case, however, as the negative electrode and/or the positive electrode are too wide, more significant irregularities in deposition may possibly result within the electrodes. It is thus necessary to choose the position of the lithium electrode to be disposed by taking the cell configuration, the size of the electrodes, etc. into account.

In the organic electrolyte capacitor of the invention, by disposing the lithium electrode to be supported on the negative electrode and/or the positive electrode locally at a specific position, not only is it possible to enhance the degree of freedom in the cell design and productivity, but it is also possible to provide excellent charging and discharging characteristics.

(F) Electrolyte

As an electrolyte used in the organic electrolyte capacitor of the invention, an electrolyte capable of transporting lithium ions is used. Such an electrolyte is normally in the form of liquid and impregnated in the separators. As the separators, a porous body or the like having no electron conduction, provided with communicating pores, and having permanence against an electrolyte solution, the electrode active material, or the like, can be used. Also, an electrolyte in the form of gel or solid may be used. In this case, the separators may be omitted, and there is an effect of preventing leakage.

As an electrolyte capable of transporting lithium ions, for example, lithium salts, such as $LiClO_4$, $LiAsF_6$, $LiBF_4$, $LiPF_6$, and $Li(C_2F_5SO_2)_2N$, can be used suitably from the view point that no electrolysis takes places even when a high voltage is applied and lithium ions can remain in a stable manner. In such a case, it is preferable to use an aprotic organic solvent as a solvent in which lithium salts are to be dissolved.

Examples of the aprotic organic solvent include, ethylene carbonate, propylene carbonate, dimethyl carbonate, diethyl carbonate, γ-butyrolactone, acetonitrile, dimethoxy-ethane, tetrahydrofuran, dioxolane, methylene chloride, sulfolane, etc. Further, a mixed solution made by mixing two or more kinds of these aprotic organic solvents can be used.

The electrolyte and the solvent are mixed in a satisfactory dehydrated state to form an electrolyte. It is preferable that the concentration of the electrolyte in the electrolyte solution is at least 0.1 mol/l or higher to reduce the internal resistance caused by the electrolyte solution, and it is particularly preferable to set the concentration to fall within the range of 0.5 to 1.5 mol/l.

(G) Outer Container

Materials of the outer container of the organic electrolyte capacitor of the invention are not particularly limited. Various materials normally used for a battery or a capacitor can be used. A metal material, such as iron and aluminum, plastic materials, or composite materials made by laminating the foregoing materials, can be used. The shape of the outer container is not particularly limited, either. A shape, such as a cylindrical shape and a prismatic shape, can be chosen to suit the use. In terms of a reduction in size and weight of the organic electrolyte capacitor, it is preferable to use an outer container of a film type using a laminated film made of aluminum and polymeric materials, such as nylon and polypropylene.

As has been described, the film battery uses a triple-layer laminated film in which a nylon film is bonded to the outer side of an aluminum foil and a layer of denatured polypropylene or the like is bonded to the inner side, as an exterior material. The laminated film is normally deep-drawn to a specific size. After a unit made by laminating or winding the positive electrodes, the negative electrodes, and the separators is placed inside and the interior is filled with an electrolyte solution, the laminated films are sealed by means of heat seal. An electrical storage device is thus obtained. In this instance, it is possible to pull out the positive electrode terminal (for example, an aluminum foil having a thickness of about 100 μM) and the negative electrode terminal (for example, a nickel foil having a thickness of 100 μm) to the outside of the cell from a space between the laminated films.

In other words, the laminated films are sealed by a method as simple as heat sealing the laminated films while pinching the positive electrode terminal and the negative electrode terminal in between. It should be noted, however, that it is preferable to devise a technique for achieving a satisfactory sealed state by using thin metal foils as described above as the terminals or laminating a sealant film preliminarily on the surfaces of the terminals.

Referring to FIG. 1, the laminated films 4 and 5 are used as the outer container, and the laminated film 5 is deep-drawn by a quantity comparable to the thickness of the three-electrode laminated unit; however, either of the laminated films 4 and 5 or both of them may be deep-drawn. Referring to FIG. 1, a pair of two films is used as the laminated films, and the films are layered to cover the content. The content is encapsulated by heat sealing the layered peripheral portions.

In the invention, the laminated film is not limited to a sheet-shaped film as the one used in FIG. 1, and a film member preliminarily molded into a thecal shape or a bag shape can be used. When a thecal molded film member is used, the content is encapsulated by heat sealing two opposing sides. When a bag-shaped film member is used, the content is encapsulated by heat sealing an opening one side.

(H) Principle of Organic Electrolyte Capacitor of the Invention

In the electric double layer capacitor of the related art, an almost equal quantity of the same active material (chiefly, activated carbon) is used as both the positive electrode and the negative electrode. The active material used for the positive electrode and the negative electrode has potential of about 3 V in reference to Li/Li+ potential when the cell is fabricated. When the cell is charged, the positive electrode potential rises as anions form an electric double layer on the surface of the positive electrode, whereas potential drops as cations form an electric double layer on the surface of the negative electrode.

Conversely, when the cell is discharged, anions and cations are released into the electrolyte solution from the positive electrode and the negative electrode, respectively, so that potentials of the respective electrodes drop and rise and restore to the vicinity of 3 V. In other words, the shape of the charging and discharging curves of the positive electrode and the negative electrode is almost line symmetric with respect to 3 V, and a quantity of change in potential of the positive electrode and a quantity of change in potential of the negative electrode are almost equal. In addition, anions alone go in and come out from the positive electrode and cations alone go in and come out from the negative electrode.

Meanwhile, in the organic electrolyte capacitor of the invention, it is preferable to use an active material capable of reversibly supporting lithium ions and/or anions as the positive electrode. Such an active material includes activated carbon used as the positive electrode and the negative electrode in the electric double layer capacitor of the related art. Also, an active material capable of reversibly supporting lithium ions is used as the negative electrode. Such an active material includes carbon materials, such as graphite, normally used in a lithium ion rechargeable battery.

The organic electrolyte capacitor of the invention is designed in such a manner that, the organic electrolyte capacitor having a cell capacity X (mAh) when the organic electrolyte capacitor in the charged state is discharged to half the charging voltage over $1\pm0.25$ hours, and having a full negative electrode capacity Y (mAh) when the negative electrode in the charged state is discharged to 1.5 V (Li/Li+), and wherein a ratio of the positive electrode active material and the negative electrode active material is controlled to be with the range $0.05 \leq X/Y \leq 0.3$.

In the invention, the capacitance and the capacity are defined as follows. That is, the capacitance of the cell indicates an inclination of the discharging curve of the cell and is expressed in the unit of F (farad). The capacitance per unit weight of the cell is a value obtained by dividing the capacitance of the cell by a total of a weight of the positive electrode active material and a weight of the negative electrode active material filled inside the cell, and is expressed in the unit of F/g. The capacitance of the positive electrode indicates an inclination of the discharging curve of the positive electrode and is expressed in the unit of F. The capacitance per unit weight of the positive electrode is a value obtained by dividing the capacitance of the positive electrode by a weight of the positive electrode active material filled inside the cell, and is expressed in the unit of F/g. The capacitance of the negative electrode indicates an inclination of the discharging curve of the negative electrode and is expressed in the unit of F. The capacitance per unit weight of the negative electrode is a value obtained by dividing the capacitance of the negative electrode by a weight of the negative electrode active material filled inside the cell, and is expressed in the unit of F/g.

Further, the cell capacity is a product of a difference between the discharge starting voltage and the discharge ending voltage of the cell, that is, a quantity of change in voltage, and the capacitance of the cell, and is expressed in the unit of C (coulomb). Because 1 C is a quantity of electric charge when a current of 1 A flows for 1 sec, in this patent, it is converted to the unit of mAh. A positive electrode capacity is a product of a difference between the positive electrode potential when the discharge starts and the positive electrode potential when the discharge ends (a quantity of change in positive electrode potential) and the capacitance of the positive electrode, and is expressed in the unit of C or mAh.

Likewise, the negative electrode capacity is a product of a difference between the negative electrode potential when the discharge starts and the negative electrode potential when the discharge ends (a quantity of change in negative electrode potential) and the capacitance of the negative electrode, and is expressed in the unit of C or mAh. These cell capacity, positive electrode capacity, and negative electrode capacity coincide with each other.

Also, the discharging capacity of the cell varies with a flowing current density. Normally, the capacity decreases when the cell is discharged at a large current density, and a capacity increases when the cell is discharged at a small current density. Hence, in the this application, a capacity when the cell is discharged at a current at which the cell in the charged state is discharged to half the charging voltage over $1\pm0.25$ hours is defined as the cell capacity a (mAh).

The charging voltage referred to herein is a voltage set to obtain the discharge capacity.

Normally, a commercially available lithium ion rechargeable battery is designed so that it is charged up to 4.2 V and discharged to about 3 V. At this point in time, the negative electrode has been discharged to 0.5 to 1.0 V. Because it is normal that the negative electrode used in the lithium ion rechargeable battery does not have a capacity at 1.5 V or larger, in this application, a capacity when the negative electrode taken out from the cell in the charged state is discharged to 1.5 V (Li/Li+) is defined as the full negative electrode capacity Y (mAh).

The organic electrolyte capacitor of the invention is designed in such a manner that, given the cell capacity X (mAh) and the full negative electrode capacity Y(mAh) as defined above, then a ratio of the positive electrode active material and the negative electrode active material is controlled to satisfy $0.05 \leq X/Y \leq 0.3$. A high output characteristic can be thus obtained.

The ratio of the positive electrode active material and the negative electrode active material referred to herein is a value obtained by dividing a weight of the positive electrode active material by a weight of the negative electrode active material.

In the lithium ion rechargeable battery, although it depends on the electrode active materials used, it is normal that X=Y (that is, X/Y=1) is almost satisfied. In other words, in the lithium ion rechargeable battery, X/Y=0.05 means that the depth of discharge is 5%, and X/Y=0.3 means that the depth of discharge is 30%. It is thought that a high output can be obtained also in the lithium ion rechargeable battery when the battery is discharged within this range.

On the other hand, in this application, a capacity when the cell is discharged at a current at which the cell in the charged state is discharged to half the charging voltage over $1\pm0.25$ hours is defined as the cell capacity X (mAh). Hence, by controlling a ratio of the positive electrode active material and the negative electrode active material under these charged and discharged conditions, it is possible to satisfy $0.05 \leq X/Y \leq 0.3$ An organic electrolyte capacitor having a high output characteristic can be thus achieved.

In the case of X/Y<0.05, although the output characteristic is high, the energy density is deteriorated. Also, in the case of X/Y>0.3, although a high energy density is obtained, the output characteristic is deteriorated.

It is preferable to have lithium ions supported preliminarily on the negative electrode and/or the positive electrode, because a ratio of the positive electrode active material and the negative electrode active material to satisfy $0.05 \leq X/Y \leq 0.3$ can be designed more flexibly.

Further, it is preferable that the capacitance per unit weight of the negative electrode active material is three times or more the capacitance per unit weight of the positive electrode active material, and the weight of the positive electrode active material is larger than the weight of the negative electrode active material, because a high energy density can be obtained.

In one example of the organic electrolyte capacitor of the invention, at the point in time at which a specific quantity of lithium ions are supported preliminarily on the negative electrode to obtain a capacity needed for the negative electrode capacity, the positive electrode potential is about 3 V whereas the negative electrode potential is lower than 3 V.

How high the charging voltage of the capacitor can be increased is determined almost by the positive electrode potential. In other words, when the positive electrode potential becomes higher, the electrolyte solution undergoes oxidative destruction, and the demarcation potential is set at this potential. In comparison with a capacitor having a normal cell configuration, in the capacitor of the invention of the configuration in which lithium ions are preliminarily supported on the electrode, a large difference can be secured between the positive electrode potential and the negative electrode potential due to low negative electrode potential. Hence, in contrast to the electric double layer capacitor of the related art having a withstand voltage of about 2.3 to 2.7 V, it can be set to about 3.6 to 4.1 V, that is, as high as or higher than 3 V, in the configuration of the invention. An energy density can be therefore enhanced.

Also, a capacity of the positive electrode can be increased due to low negative electrode potential. In other words, it is possible to increase a quantity of change in potential caused by discharge in the positive electrode due to low negative electrode potential. More specifically, it is possible to lower the positive electrode potential at the end of the discharge to a value smaller than 3 V, for example, to 2 V. This is because the potential has dropped in the positive electrode as anions are chiefly released until it is discharged to 3 V, and lithium ions are doped in when the potential is 3 V or below.

In the electric double layer capacitor of the related art, the positive electrode potential drops only to about 3 V during discharge. This is because the negative electrode potential also reaches 3 V at the same time, and the cell voltage becomes 0V. In other words, the configuration of the invention in which the positive electrode potential can drop to 2 V is able to achieve a higher capacity than the configuration of the electric double layer capacity of the related art in which the positive electrode potential is allowed to drop only to 3 V.

(I) Manufacturing Method of Organic Electrolyte Capacitor

Hereinafter, one example of a manufacturing method of the organic electrolyte capacitor of the invention will be described. Firstly, the through-pores in the electrode current collectors are filled in with the conductive materials. A technique for filling in the through-pores in the electrode current collectors with the conductive materials is not particularly limited, and a known technique including the coating technique, such as a die method, a dipping method, and a spraying method, and printing technique, such as gravure, screen, and transferring, can be used.

Subsequently, the positive electrode and the negative electrode are formed on the electrode current collectors in which the through-pores are filled in with the conductive materials. The positive electrode is formed by slurry which mixed the positive electrode active material with the binder resin, and coating the positive electrode current collector with the slurry by drying. Likewise, the negative electrode is formed by slurry which mixed the negative electrode active material with the binder resin, and coating the negative electrode current collector with the slurry followed by drying.

The lithium electrode is formed by pressure bonding lithium metal onto the lithium electrode current collector made of a conductive porous body. The thickness of the lithium electrode current collector is about 10 to 200 μm, and although it varies with a quantity of the negative electrode active material used, the thickness of the lithium metal is normally 50 to 300 μm.

After the electrodes are dried, they are cut in the width to match with the size of the outer container of the organic electrolyte capacitor. When a winding type electrode laminated unit is formed, they are cut in the shape of a ribbon. In this instance, they may be cut in the shape having an extended portion used as the terminal welding portion.

Figure 11:
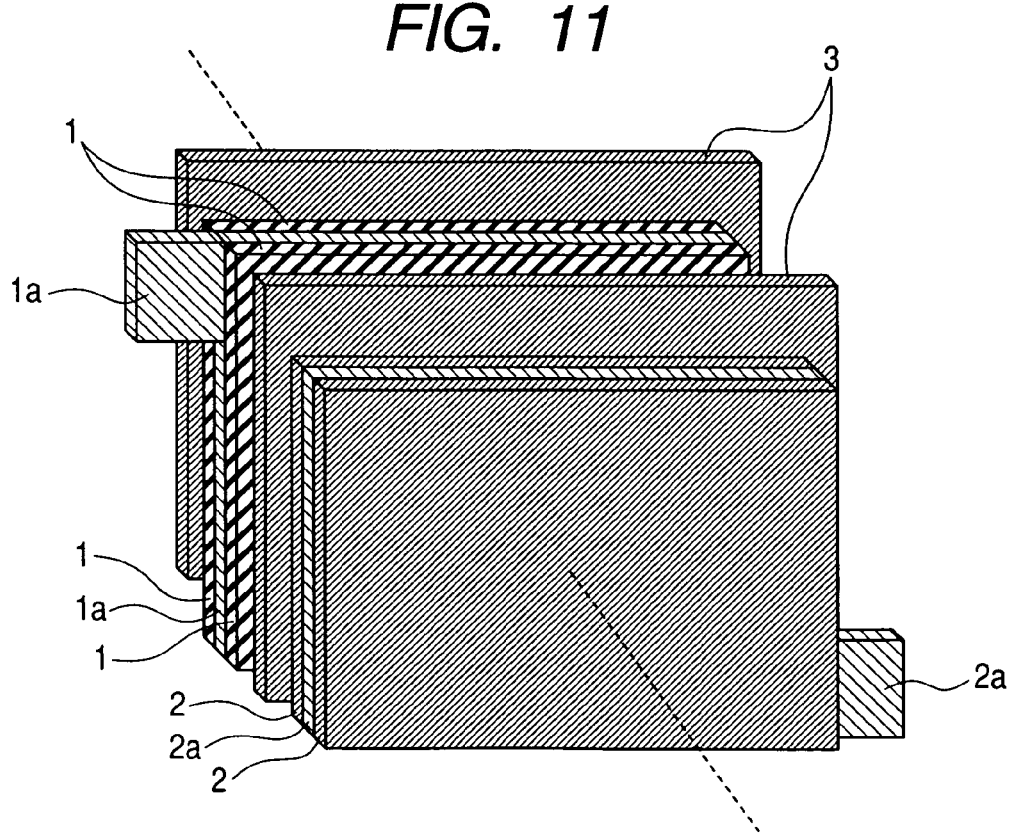
FIG. 11 is a developed perspective view showing one example of an electrode laminated unit.
Figure 12:
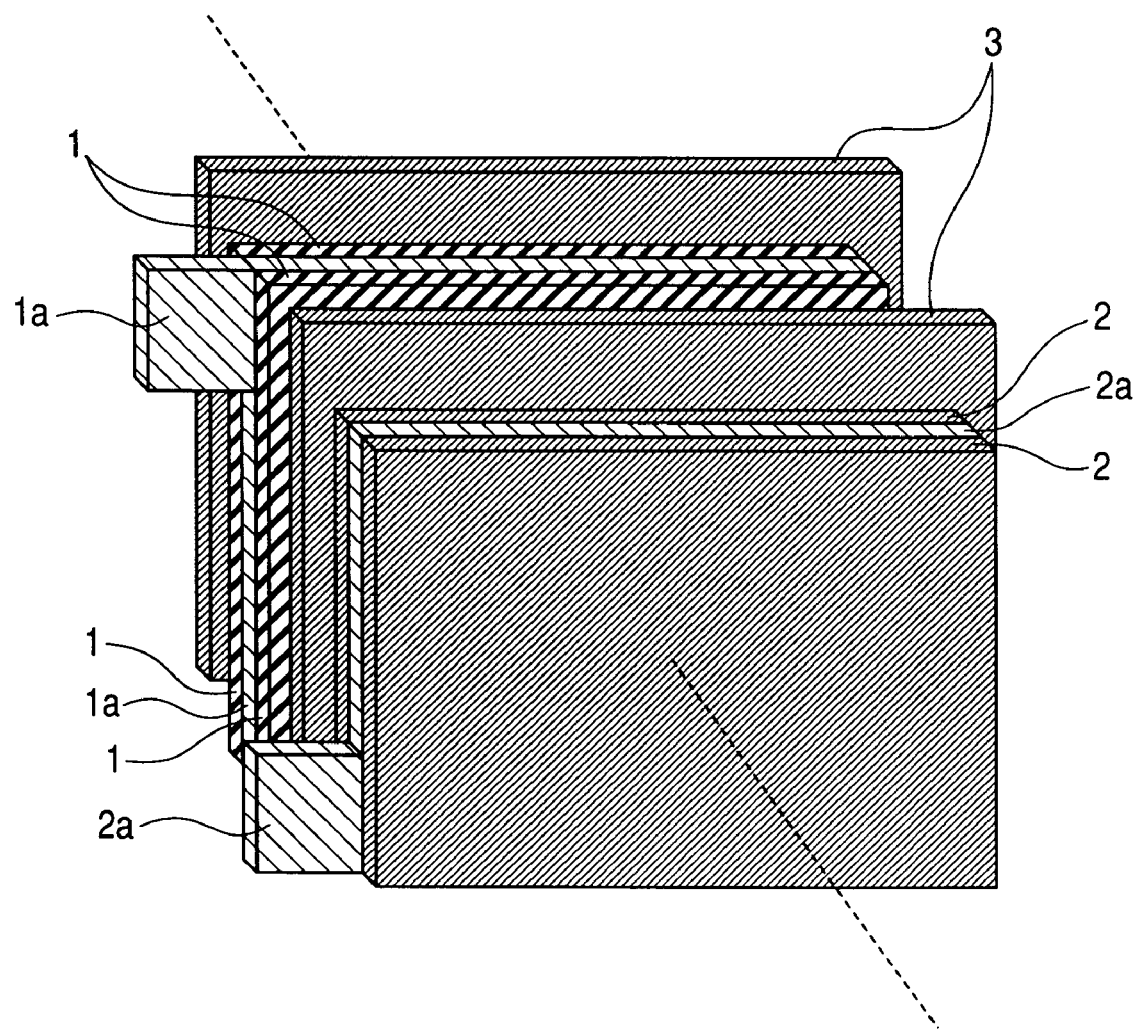
FIG. 12 is a developed perspective view showing another example of the electrode laminated unit.

Subsequently, a three-electrode laminated unit is fabricated using the electrode current collectors, on which the electrodes are formed, by interposing separators so that the positive electrode and the negative electrode will not come into direct contact. FIG. 11 and FIG. 12 are development elevations of the electrode laminated unit, and indicate the shape and the lamination direction of the terminal welding portions. FIG. 11 is an example where the terminal welding portion of the positive electrode and the terminal welding portion of the negative electrode protrude from opposite sides. FIG. 12 shows an example where the terminal welding portion of the positive electrode and the terminal welding portion of the negative electrode protrude from the same side. It should be appreciated, however, that the directions of the terminals of the positive electrode and the negative electrode are not limited to the directions in these two cases.

The positive electrode terminal is welded to the terminal welding portion of the positive electrode current collector in the fabricated three-electrode laminated unit, and the negative electrode terminal is welded to the terminal welding portions of the negative electrode current collector and the lithium electrode current collector by means of ultrasonic welding or the like.

The three-electrode laminated unit welded to the external terminals is placed inside the outer container, and the outer container is closed by means of heat seal by leaving an inlet of the electrolyte open. In this instance, at least part of the external terminals is exposed to the outside of the exterior container so that they can be connected to the external circuit. The electrolyte is injected through the inlet of the electrolyte of the outer container, and after the interior of the outer container is filled with the electrolyte, the inlet of the electrolyte is closed by means of heat seal or the like. By sealing the exterior container completely, the organic electrolyte capacitor of the invention can be obtained.

When an electrolyte solution is injected, all the negative electrodes and the lithium electrode come into contact with each other electromechanically, and lithium ions dissolved into the electrolyte solution from the lithium electrode gradually move to the negative electrodes as the time elapses to be supported on the negative electrodes. For lithium ions to be supported on the negative electrodes, it is preferable to devise a technique for holding the negative electrodes by applying an external force so that the flatness of the negative electrodes will not be lost by preventing the negative electrodes from undergoing deformation due to distortion caused by lithium ions coming into the negative electrodes.

In particular, the contact pressure from the outer container is weaker in the film battery than in a battery using a metal case, such as a cylindrical battery and a prismatic battery. Hence, it is preferable to apply a pressure from the outside to keep the flatness of the positive electrodes and the negative electrodes, because the cell itself has no distortion and the cell performance can be enhanced.

Hereinafter, more concrete examples will be described in detail.

EXAMPLES

Example 1

(Manufacturing Method of Negative Electrode PAS Slurry)

A mold plate of phenol resin having a thickness of 0.5 mm is placed in a silicon it electric furnace, and the temperature is raised to 500° C. at a rate of 50° C./hour under a nitrogen atmosphere, and further to 650° C. at a rate of 10° C./hour followed by heat treatment to synthesize PAS. The PAS plate thus obtained is pulverized by a ball mill, and PAS powder having a mean particle size of 7 μm is obtained. H/C ratio of the PAS powder is 0.22.

Subsequently, slurry is obtained by sufficiently mixing 92 parts by weight of the PAS powder, 4 parts by weight of acetylene black powder, 4 parts by weight of SBR, 3.2 parts by weight of carboxymethyl cellulose, and 120 parts by weight of ion-exchanged water at this composition.

(Measurement of Capacitance Per Unit Weight of Negative Electrode)

About 7 mg/cm$^2$ of the slurry in solid content is coated on one side of a copper foil having a thickness of 18 μm followed by drying and pressing. A PAS electrode is thus obtained. The electrode is cut in the size of 1.5×2.0 cm$^2$ to be used as evaluation negative electrodes. The negative electrode and metallic lithium having a size of 1.5×2.0 cm$^2$ and a thickness of 250 μm as a counter electrode were overlaid with a polyethylene nonwoven fabric having a thickness of 50 μm as a separator interposed therebetween to assemble two mimic cell. Metallic lithium is used as a reference electrode. A solution made by dissolving LiPF$_6$ into propylene carbonate at a concentration of 1 mol/l is used as the electrolyte solution.

Subsequently, 400 mAh/g of lithium ions on the basis of the weight of the negative electrode active material are charged at a charging current of 1 mA in one cell, and then the cell is discharged to 1.5 V at 1 mA. The capacitance per unit weight of the negative electrode is found to be 652 F/g from a discharging time needed for a change of 0.2 V in potential from the potential of the negative electrode one minute later since the discharge started.

In the same manner, 500 mAh/g of lithium ions on the basis of the weight of the negative electrode active material are charged at a charging current of 1 mA in the remaining one cell, and then the cell is discharged to 1.5 V at 1 mA. The capacitance per unit weight of the negative electrode is found to be 748 F/g from a discharging time needed for a change of 0.2 V in potential from the potential of the negative electrode one minute later since the discharging started.

(Manufacturing Method of Positive Electrode Activated Carbon Slurry)

Coconut shells used as a raw material are placed in an electric furnace and the temperature is raised to 950° C. at a rate of 50° C./hour under an air flow of nitrogen. Subsequently, the coconut shells are activated for two hours using a mixed gas of nitrogen and water vapor mixed at a ratio of 1:1. Activated carbon having a specific surface area of 1860 m$^2$/g is thus manufactured. Activated carbon powder having a mean particle size of 5 μm is obtained by pulverizing the activated carbon using a ball mill pulverizer.

Slurry is obtained by mixing 92 parts by weight of the activated carbon powder, 4 parts by weight of acetylene black powder, 4 parts by weight of SBR, 1 part by weight of carboxymethyl cellulose, and 150 parts by weight of ion-exchanged water in a satisfactory manner at this composition.

(Measurement of Capacitance Per Unit Weight of Positive Electrode)

About 7 mg/cm$^2$ of the slurry in solid content is coated on one surface of an aluminum foil coated with a carbon-based conductive coating material and having a thickness of 20 μm followed by drying and pressing. The positive electrode is thus obtained.

Three positive electrodes having a size of 1.5×2.0 cm$^2$ are cutout. One is used as the positive electrode, and another is used as the negative electrode and the reference electrode. The positive electrode and negative electrode were overlaid with a paper nonwoven fabric having a thickness of 50 μm as a separator interposed therebetween to assemble a mimic cell. A solution made by dissolving triethyl methylammoniumtetrafluoroborate (TEMA·BF4) in propylene carbonate at a concentration of 1 mol/l is used as the positive electrode electrolyte solution.

The cell is charged to 2.5 V at a charging current of 10 mA followed by constant voltage charge. After the cell is charged for one hour as a total charging time, the cell is discharged to 0 V at 1 mA. Capacitance per unit weight of the cell is found to be 22 F/g from a discharging time from 2.0 V to 1.5 V. An capacitance per unit weight of the positive electrode is found to be 88 F/g in the same manner from a potential difference between the reference electrode and the positive electrode.

(Manufacturing Method of Negative Electrode 1)

A non-aqueous carbon-based conductive coating material (EB-815, a product of Acheson (Japan) Limited) is sprayed and coated on the both surfaces of expanded metal made of copper (available from Nippon Metal Industry Co. Ltd.) having a thickness of 32 μm (porosity: 50%) followed by drying. A negative electrode current collector, on which conductive layers are formed, is thus obtained. A total thickness (a sum of the thickness of the current collector and the thicknesses of the conductive layers) is 49 μm, and the through-pores are filled in with the conductive coating material almost completely. The slurry for the negative electrode is molded on the both surfaces of the negative electrode current collector by a roll coater followed by pressing. A negative electrode 1 having a thickness of 155 μm as a total thickness of the negative electrode (a sum of the thicknesses of the negative electrode layers on the both surfaces, the thicknesses of the conductive layers on the both surfaces, and the thickness of the negative electrode current collector) is thus obtained.

(Manufacturing Method of Positive Electrode 1)

A non-aqueous carbon-based conductive coating material (EB-815, a product of Acheson (Japan) Limited) is sprayed and coated on the both surfaces of expand metal made of aluminum (available from Nippon Metal Industry Co. Ltd.) having a thickness of 35 μm (porosity: 50%) followed by drying. A positive electrode current collector, on which conductive layers are formed, is thus obtained. A total thickness (a sum of the thickness of the current collector and the thicknesses of the conductive layers) is 52 μm, and the through-pores are filled in with the conductive coating material almost completely. The slurry for the positive electrode is molded on the both surfaces of the positive electrode current collector by a roll coater followed by pressing. A positive electrode 1 having a thickness of 214 μm as a total thickness of the positive electrode (a sum of the thicknesses of the positive electrode layers on the both surfaces, the thicknesses of the conductive layers on the both surfaces, and the thickness of the positive electrode current collector) is thus obtained.

(Fabrication of Cell)

The negative electrode 1 having the thickness of 155 μm and the positive electrode 1 having the thickness of 214 μm are cut out in a shape as shown in FIG. 11 so that each had an electrode area of 5.0×8.0 cm². They are laminated by disposing the positive electrode current collector and the negative electrode current collector in such a manner that their welding portions to the connection terminals (hereinafter, referred to as the connection terminal welding portions) are on the opposite sides as shown in FIG. 11 using cellulose/rayon mixed nonwoven fabric having a thickness of 30 μm as the separators to achieve a cell thickness of about 4 mm. Then, eight positive electrodes and eight negative electrodes are laminated.

The electrode laminated unit is obtained by disposing the separators at the uppermost portion and the lowermost portion and then taping the four sides of each separator. A lithium metal foil having a thickness of 140 μm and pressure bonded to a stainless steel net having a thickness of 80 μm is used as 400 mAh/g of lithium metal on the basis of the weight of the negative electrode active material, and one sheet of foil is disposed on the outermost portion of the electrode laminated unit to oppose the negative electrodes. The negative electrodes (8 sheets) and the stainless steel net, to which lithium metal is pressure bonded, are welded and brought into contact with each other. The electrode lamination unit is thus obtained. The weight of the positive electrode active material is 0.97 times the weight of the negative electrode active material.

The positive electrode terminal made of aluminum having a width of 10 mm, a length of 30 mm, and a thickness of 0.2 mm, on which a sealant film had been heat sealed preliminarily at the seal portion, is superimposed on the terminal welding portions (8 sheets) of the positive electrode current collectors in the electrode lamination unit by means of ultrasonic welding. Likewise, the negative electrode terminal made of nickel having a width of 10 mm, a length of 30 mm, and a thickness of 0.2 mm, on which a sealant film had been heat sealed preliminarily at the seal portion, is superimposed on the terminal welding portions (8 sheets) of the negative electrode current collectors by means of ultrasonic welding. The electrode laminated unit is thus provided inside the two outer films (a total space of 4 mm) that are deep-drawn to have a height of 102 mm, a width of 52 mm, and a depth of 2 mm.

After the two sides and another one side of the terminal portions of the outer laminated films are heat sealed, a solution in which $LiPF_6$ is dissolved in a mixed solvent made by mixing ethylene carbonate, diethyl carbonate, and propylene carbonate at a weight ratio of 3:4:1 at a concentration of 1 mol/l is impregnated in vacuum as the electrolyte solution. Vacuum sealing is performed by heat sealing the remaining one side under reduced pressure. Three cells are thus fabricated as film capacitors (the thickness of the cell is 4.0 mm).

(Evaluation of Characteristic of Cell)

After the cells are allowed to stand for 14 days in room temperature, one cell is disassembled. Because the lithium metal completely disappeared, it is judged that lithium ions to obtain capacitance of 650 F/g or more per unit weight of the negative electrode active material are preliminary charged. Capacitance ratio per unit weight between the negative electrode active material and the positive electrode active material is 7.41.

The remaining two cells are charged at a constant current of 1000 mA until the cell voltage reached 3.6 V, and the cells are then subjected to constant current—constant voltage charge to keep applying a constant voltage of 3.6 V for one hour. Subsequently, the cells are discharged at a constant current of 100 mA until the cell voltage reached 1.8 V. The cycle of 3.6 V to 1.8 V is repeated, and the discharge capacity at the third cycle is 105 mAh as the mean value of the two cells (the discharging time is 1.05 hours). Also, the energy density is 14.0 Wh/l when the vertical length of the cell is 100 mm and the horizontal length is 50 mm.

After the cell capacities are evaluated, one cell is charged at a constant current of 1000 mA until the cell voltage reached 3.6 V. Subsequently, the cell is subjected to constant current—constant voltage charge to keep applying a constant voltage of 3.6 V for one hour. The cell is then disassembled within an argon box not to cause a short circuit between the positive electrodes and the negative electrodes, and eight sheets of the negative electrodes are taken out. Subsequently, a three-electrode cell is fabricated by way of trial using each negative electrode as an operating electrode, and lithium metal as the counter electrode and the reference electrode. The cell is discharged at a constant current of 100 mA until the negative electrode potential reached 1.5 V. The full negative electrode capacity b is 497 mAh as a total of the discharge capacities of eight sheets of the negative electrodes.

The remaining one cell is charged at a constant current of 1000 mA until the cell voltage reached 3.6 V. The cell is then subjected to constant current—constant voltage charge to keep applying a constant voltage of 3.6 V for one hour, and discharged at a constant current of 10 A until the cell voltage reached 1.8 V. The discharge capacity at this point in time is 57 mAh. The results are set forth in Table 1 below.

TABLE 1

| | Cell capacity a at 100 mA discharge (mAh) | Full negative electrode capacity b (mAh) | Energy density (Wh/l) | Discharge capacity at 10 A (mAh) | Capacity retention (%) | a/b |
|---|---|---|---|---|---|---|
| Example 1 | 105 | 497 | 14.0 | 57 | 54 | 0.21 |

Example 2

Three cells are fabricated as film capacitors in the same manner as Example 1 except that a negative electrode 2 coated so that a total thickness of the pressed negative electrode (a sum of the thicknesses of the negative electrode layers on the both surfaces, the thicknesses of the conductive layers on the both surfaces, and the thickness of the negative electrode current collector) is 188 μm, and a positive electrode 2 coated so that a total thickness of the pressed positive electrode (a sum of the thicknesses of the positive electrode layers on the both surfaces, the thicknesses of the conductive layers on the both surfaces, and the thickness of the positive electrode current collector) is 209 μm, are used.

Number of the positive electrodes and the negative electrodes are 8 sheets respectively, and the thickness of the cells is 4.3 mm. A lithium metal foil having a thickness of 180 μm and pressure bonded to a stainless steel net having a thickness of 80 μm is used as 400 mAh/g of lithium metal on the basis of the weight of the negative electrode active material, and one sheet of that is disposed at the outermost portion of the electrode laminated unit to oppose the negative electrodes. The weight of the positive electrode active material is 0.72 times the weight of the negative electrode active material.

(Evaluation of Characteristic of Cell)

The cells are allowed to stand for 14 days in room temperature, and one cell is disassembled. Because the lithium metal completely disappeared, it is judged that lithium ions to obtain capacitance of 650 F/g or more per unit weight of the negative electrode active material are preliminary charged. Capacitance ratio per unit weight between the negative electrode active material and the positive electrode active material is 7.41.

The remaining two cells are charged at a constant current of 1000 mA until the cell voltage reached 3.6 V. The cells are then subjected to constant current—constant voltage charge to keep applying a constant voltage of 3.6 V for one hour. The cells are then discharged at a constant current of 100 mA until the cell voltage reached 1.8 V. The cycle of 3.6 V to 1.8 V is repeated, and the discharge capacity at the third cycle is 104 mAh as the mean value of the two cells (the discharging time is 1.04 hours). Also, the energy density is 13.1 Wh/l when the vertical length of the cell is 100 mm and the horizontal length is 50 mm.

After the cell capacities are evaluated, one cell is charged at a constant current of 1000 mA until the cell voltage reached 3.6 V. Subsequently, the cell is then subjected to constant current—constant voltage charge to keep applying a constant voltage of 3.6 V for one hour. The cell is then disassembled within an argon box not to cause a short circuit between the positive electrodes and the negative electrodes, and eight sheets of the negative electrodes are taken out. Subsequently, a three-electrode cell is fabricated by way of trial using each negative electrode as an operating electrode, and lithium metal as the counter electrode and the reference electrode. The cell is discharged at a constant current of 100 mA until the negative electrode potential reached 1.5 V. The full negative electrode capacity b is 706 mAh as a total of the discharge capacities of eight sheets of the negative electrodes.

The remaining one cell is charged at a constant current of 1000 mA until the cell voltage reached 3.6 V. The cell is then subjected to constant current—constant voltage charge to keep applying a constant voltage of 3.6 V for one hour, and discharged at a constant current of 10 A until the cell voltage reached 1.8 V. The discharge capacity at this point in time is 59 mAh. The results are set forth in Table 2 below.

TABLE 2

| | Cell capacity a at 100 mA discharge (mAh) | Full negative electrode capacity b (mAh) | Energy density (Wh/l) | Discharge capacity at 10 A (mAh) | Capacity retention (%) | a/b |
|---|---|---|---|---|---|---|
| Example 2 | 104 | 706 | 13.1 | 59 | 57 | 0.15 |

Example 3

Three cells are fabricated as film capacitors in the same manner as Example 1 except that a negative electrode 3 coated so that a total thickness of the pressed negative electrode (a sum of the thicknesses of the negative electrode layers on the both surfaces, the thicknesses of the conductive layers on the both surfaces, and the thickness of the negative electrode current collector) is 137 μm, and a positive electrode 3 coated so that a total thickness of the pressed positive electrode (a sum of the thicknesses of the positive electrode layers on the both surfaces, the thicknesses of the conductive layers on the both surfaces, and the thickness of the positive electrode current collector) is 219 μm, are used.

Number of the positive electrodes and the negative electrodes are 8 sheets respectively, and the thickness of the cells is 3.9 mm. A lithium metal foil having a thickness of 110 μm and pressure bonded to a stainless steel net having a thickness of 80 μm is used as 400 mAh/g of lithium metal on the basis of the weight of the negative electrode active material, and one sheet of that is disposed at the outermost portion of the electrode laminated unit to oppose the negative electrodes. The weight of the positive electrode active material is 1.21 times the weight of the negative electrode active material.

(Evaluation of Characteristic of Cell)

The cells are allowed to stand for 14 days in room temperature, and one cell is disassembled. Because the lithium metal completely disappeared, it is judged that lithium ions to obtain capacitance of 650 F/g or more per unit weight of the negative electrode active material are preliminary charged. Capacitance ratio per unit weight between the negative electrode active material and the positive electrode active material is 7.41.

The remaining two cells are charged at a constant current of 1000 mA until the cell voltage reached 3.6 V. The cells are then subjected to constant current—constant voltage charge to keep applying a constant voltage of 3.6 V for one hour. The cells are then discharged at a constant current of 100 mA until the cell voltage reached 1.8 V.

The cycle of 3.6 V to 1.8 V is repeated, and the discharge capacity at the third cycle is 105 mAh as the mean value of the two cells (the discharging time is 1.05 hours). Also, the energy density is 15.7 Wh/l when the vertical length of the cell is 100 mm and the horizontal length is 50 mm.

After the cell capacities are evaluated, one cell is charged at a constant current of 1000 mA until the cell voltage reached 3.6 V. Subsequently, the cell is subjected to constant current—constant voltage charge to keep applying a constant voltage of 3.6 V for one hour. The cell is then disassembled within an argon box not to cause a short circuit between the positive electrodes and the negative electrodes, and eight sheets of the negative electrodes are taken out. Subsequently, a three-electrode cell is fabricated by way of trial using each negative electrode as an operating electrode, and lithium metal as the counter electrode and the reference electrode. The cell is discharged at a constant current of 100 mA until the negative electrode potential reached 1.5 V. The full negative electrode capacity b is 401 mAh as a total of the discharge capacities of the eight sheets of the negative electrodes.

The remaining one cell is charged at a constant current of 1000 mA until the cell voltage reached 3.6 V. The cell is then subjected to constant current—constant voltage charge to keep applying a constant voltage of 3.6 V for one hour, and discharged at a constant current of 10 A until the cell voltage reached 1.8 V. The discharge capacity at this point in time is 55 mAh. The results are set forth in Table 3 below.

TABLE 3

| | Cell capacity a at 100 mA discharge (mAh) | Full negative electrode capacity b (mAh) | Energy density (Wh/l) | Discharge capacity at 10 A (mAh) | Capacity retention (%) | a/b |
|---|---|---|---|---|---|---|
| Example 3 | 105 | 401 | 14.5 | 55 | 52 | 0.26 |

Comparative Example 1

Three cells are fabricated as film capacitors in the same manner as Example 1 except that a negative electrode 4 coated so that a total thickness of the pressed negative electrode (a sum of the thicknesses of the negative electrode layers on the both surfaces, the thicknesses of the conductive layers on the both surfaces, and the thickness of the negative electrode current collector) is 116 μm, and a positive electrode 4 coated so that a total thickness of the pressed positive electrode (a sum of the thicknesses of the positive electrode layers on the both surfaces, the thicknesses of the conductive layers on the both surfaces, and the thickness of the positive electrode current collector) is 227 μm, are used. Number of the positive electrodes and the negative electrodes are 8 sheets respectively, and the thickness of the cells is 3.8 mm.

A lithium metal foil having a thickness of 90 μm and pressure bonded to a stainless steel net having a thickness of 80 μm is used as 400 mAh/g of lithium metal on the basis of the weight of the negative electrode active material, and one sheet of that is disposed at the outermost portion of the electrode laminated unit to oppose the negative electrodes. The weight of the positive electrode active material is 1.66 times the weight of the negative electrode active material.

(Evaluation of Characteristic of Cell)

The cells are allowed to stand for 14 days in room temperature, and one cell is disassembled. Because the lithium metal completely disappeared, it is judged that lithium ions to obtain capacitance of 650 F/g or more per unit weight of the negative electrode active material are preliminary charged. Capacitance ratio per unit weight between the negative electrode active material and the positive electrode active material is 7.41.

The remaining two cells are charged at a constant current of 1000 mA until the cell voltage reached 3.6 V. The cells are then subjected to constant current—constant voltage charge to keep applying a constant voltage of 3.6 V for one hour. The cells are then discharged at a constant current of 100 mA until the cell voltage reached 1.8 V. The cycle of 3.6 V to 1.8 V is repeated, and the discharge capacity at the third cycle is 106 mAh as the mean value of the two cells (the discharging time is 1.06 hours).

After the cell capacities are evaluated, one cell is charged at a constant current of 1000 mA until the cell voltage reached 3.6V. Subsequently, the cell is subjected to constant current—constant voltage charge to keep applying a constant voltage of 3.6 V for one hour. The cell is then disassembled within an argon box not to cause a short circuit between the positive electrodes and the negative electrodes, and eight sheets of the negative electrodes are taken out.

Subsequently, a three-electrode cell is fabricated by way of trial using each negative electrode as an operating electrode, and lithium metal as the counter electrode and the reference electrode. The cell is discharged at a constant current of 100 mA until the negative electrode potential reached 1.5 V. The full negative electrode capacity b is 298 mAh as a total of the discharge capacities of the eight sheets of the negative electrodes.

The remaining one cell is charged at a constant current of 1000 mA until the cell voltage reached 3.6 V. The cell is then subjected to constant current—constant voltage charge to keep applying a constant voltage of 3.6 V for one hour, and S discharged at a constant current of 10 A until the cell voltage reached 1.8 V. The discharge capacity at this point in time is 49 mAh. The results are set forth in Table 4 below.

TABLE 4

| | Cell capacity a at 100 mA discharge (mAh) | Full negative electrode capacity b (mAh) | Energy density (Wh/l) | Discharge capacity at 10 A (mAh) | Capacity retention (%) | a/b |
|---|---|---|---|---|---|---|
| Comparative Example 1 | 106 | 298 | 16.4 | 49 | 46 | 0.36 |

Comparative Example 2

Three cells are fabricated as film capacitors in the same manner as Example 1 except that a negative electrode 5 coated so that a total thickness of the pressed negative electrode (a sum of the thicknesses of the negative electrode layers on the both surfaces, the thicknesses of the conductive layers on the both surfaces, and the thickness of the negative electrode current collector) is 101 μm, and a positive electrode 5 coated so that a total thickness of the pressed positive electrode (a sum of the thicknesses of the positive electrode layers on the both surfaces, the thicknesses of the conductive layers on the both surfaces, and the thickness of the positive electrode current collector) is 241 μm, are used. Number of the positive electrodes and the negative electrodes are 8 sheets respectively, and the thickness of the cells is 3.7 mm.

A lithium metal foil having a thickness of 70 μm and pressure bonded to a stainless steel net having a thickness of 80 μm is used as 400 mAh/g of lithium metal on the basis of the weight of the negative electrode active material, and one sheet of that is disposed at the outermost portion of the electrode lamination unit to oppose the negative electrodes. The weight of the positive electrode active material is 2.33 times the weight of the negative electrode active material.

(Evaluation of Characteristic of Cell)

The cells are allowed to stand for 14 days in room temperature, and one cell is disassembled. Because the lithium metal completely disappeared, it is judged that lithium ions to obtain capacitance of 650 F/g or more per unit weight of the negative electrode active material are preliminary charged. Capacitance ratio per unit weight between the negative electrode active material and the positive electrode active material is 7.41.

The remaining two cells are charged at a constant current of 1000 mA until the cell voltage reached 3.6 V. Subsequently, the cells are subjected to constant current—constant voltage charge to keep applying a constant voltage of 3.6 V for one hour. The cells are then discharged at a constant current of 100 mA until the cell voltage reached 1.8 V.

The cycle of 3.6 V to 1.8 V is repeated, and the discharge capacity at the third cycle is 105 mAh as the mean value of the two cells (the discharging time is 1.05 hours). Also, the energy density is 16.5 Wh/l when the vertical length of the cell is 100 mm and the horizontal length is 50 mm.

After the cell capacities are evaluated, one cell is charged at a constant current of 1000 mA until the cell voltage reached 3.6 V. Subsequently, the cell is subjected to constant current—constant voltage charge to keep applying a constant voltage of 3.6 V for one hour. The cell is then disassembled within an argon box not to cause a short circuit between the positive electrodes and the negative electrodes, and eight sheets of the negative electrodes are taken out.

Subsequently, a three-electrode cell is fabricated by way of trial using each negative electrode as an operating electrode, and lithium metal as the counter electrode and the reference electrode. The cell is discharged at a constant current of 100 mA until the negative electrode potential reached 1.5 V. The full negative electrode capacity b is 222 mAh as a total of the discharge capacities of the eight sheets of the negative electrodes.

The remaining one cell is charged at a constant current of 1000 mA until the cell voltage reached 3.6 V. The cell is then subjected to constant current—constant voltage charge to keep applying a constant voltage of 3.6 V for one hour, and discharged at a constant current of 10 A until the cell voltage reached 1.8 V. The discharge capacity at this point in time is 41 mAh. The results are set forth in Table 5 below.

TABLE 5

|  | Cell capacity a at 100 mA discharge (mAh) | Full negative electrode capacity b (mAh) | Energy density (Wh/l) | Discharge capacity at 10 A (mAh) | Capacity retention (%) | a/b |
|---|---|---|---|---|---|---|
| Comparative Example 2 | 105 | 222 | 15.3 | 41 | 39 | 0.47 |

Example 4

Three cells are fabricated as film capacitors in the same manner as Example 1 except that a negative electrode 6 coated so that a total thickness of the pressed negative electrode (a sum of the thicknesses of the negative electrode layers on the both surfaces, the thicknesses of the conductive layers on the both surfaces, and the thickness of the negative electrode current collector) is 233 μm, and a positive electrode 6 coated so that a total thickness of the pressed positive electrode (a sum of the thicknesses of the positive electrode layers on the both surfaces, the thicknesses of the conductive layers on the both surfaces, and the thickness of the positive electrode current collector) is 205 μm, are used. Number of the positive electrodes and the negative electrodes are 8 sheets respectively, and the thickness of the cells is 4.7 mm.

A lithium metal foil having a thickness of 150 μm and pressure bonded to a stainless steel net having a thickness of 80 μm is used as 500 mAh/g of lithium metal on the basis of the weight of the negative electrode active material, and two sheets of that are disposed at the top and bottom of the electrode laminated unit to oppose the negative electrodes. The weight of the positive electrode active material is 0.53 times the weight of the negative electrode active material.

(Evaluation of Characteristic of Cell)

The cells are allowed to stand for 14 days in room temperature, and one cell is disassembled. Because the lithium metal completely disappeared, it is judged that lithium ions to obtain capacitance of 748 F/g or more per unit weight of the negative electrode active material are preliminary charged. Capacitance ratio per unit weight between the negative electrode active material and the positive electrode active material is 8.50.

The remaining two cells are charged at a constant current of 1000 mA until the cell voltage reached 3.6 V. Subsequently, the cells are subjected to constant current—constant voltage charge to keep applying a constant voltage of 3.6 V for one hour. The cells are then discharged at a constant current of 100 mA until the cell voltage reached 1.8 V.

The cycle of 3.6 V to 1.8 V is repeated, and the discharge capacity at the third cycle is 102 mAh as the mean value of the two cells (the discharging time is 1.02 hours). Also, the energy density is 12.4 Wh/l when the vertical length of the cell is 100 mm and the horizontal length is 50 mm.

After the cell capacities are evaluated, one cell is charged at a constant current of 1000 mA until the cell voltage reached 3.6 V. Subsequently, the cell is subjected to constant current—constant voltage charge to keep applying a constant voltage of 3.6 V for one hour. The cell is then disassembled within an argon box not to cause a short circuit between the positive electrodes and the negative electrodes, and eight sheets of the negative electrodes are taken out.

Subsequently, a three-electrode cell is fabricated by way of trial using each negative electrode as an operating electrode, and lithium metal as the counter electrode and the reference electrode. The cell is discharged at a constant current of 100 mA until the negative electrode potential reached 1.5 V. The full negative electrode capacity b is 1098 mAh as a total of the discharge capacities of eight sheets of the negative electrodes.

The remaining one cell is charged at a constant current of 1000 mA until the cell voltage reached 3.6 V. The cell is then subjected to constant current—constant voltage charge to keep applying a constant voltage of 3.6 V for one hour, and discharged at a constant current of 10 A until the cell voltage reached 1.8 V. The discharge capacity at this point in time is 61 mAh. The results are set forth in Table 6 below.

TABLE 6

|  | Cell capacity a at 100 mA discharge (mAh) | Full negative electrode capacity b (mAh) | Energy density (Wh/l) | Discharge capacity at 10 A (mAh) | Capacity retention (%) | a/b |
|---|---|---|---|---|---|---|
| Example 4 | 102 | 1098 | 12.4 | 61 | 60 | 0.09 |

Example 5

(Manufacturing Method of Negative Electrode Hard Carbon Slurry)

Powdery phenol resin (trade name: Bellpearl R800, a product of Kanebo, Ltd) having a mean particle size of 20 μm is placed in an electric furnace and the temperature is raised to 600° C. at a temperature rising rate of 50° C./hour in a nitrogen gas atmosphere, and kept for five hours at this temperature. Further, the temperature is raised to 1200° C. at a temperature rising rate of 80° C./hour and kept for 10 hours at this temperature followed by cooling. A hard carbon sample is thus manufactured.

The sample thus obtained is pulverized in a ball mill to adjust a particle size. Hard carbon powder having a mean particle size of 15 Am is thus obtained. A specific surface area value of the powder measured by the BET method is 8 m²/g.

Slurry is obtained by mixing 92 parts by weight of the hard carbon powder, 4 parts by weight of acetylene black powder, 4 parts by weight of SBR, 1.2 parts by weight of carboxymethyl cellulose, and 120 parts by weight of ion-exchanged water in a satisfactory manner at this composition.

(Measurement of Capacitance Per Unit Weight of Negative Electrode)

About 7 mg/cm² of the negative electrode hard carbon slurry in solid content is coated on one surface of a copper foil having a thickness of 18 μm followed by drying and pressing. A hard carbon electrode is thus obtained. Four negative electrodes are cut out in the size of 1.5×2.0 cm² to be used as evaluation negative electrodes.

The negative electrode and metallic lithium having a size of 1.5×2.0 cm² and a thickness of 200 μm as a counter electrode were overlaid with a polyethylene nonwoven fabric having a thickness of 50 μm as a separator interposed therebetween to assemble two mimic cell. Metallic lithium is used as a reference electrode. A solution made by dissolving $LiPF_6$ into propylene carbonate at a concentration of 1 mol/l is used as the electrolyte solution.

Subsequently, 400 mAh/g of lithium ions on the basis of the weight of the negative electrode active material are charged at a charging current of 1 mA, and then the cell is discharged to 1.5 V at 1 mA. The capacitance per unit weight of the negative electrode is found to be 8426 F/g from a discharging time needed for a change of 0.2 V in potential from the potential of the negative electrode one minute later since the discharge started.

(Manufacturing Method of Negative Electrode 7)

A non-aqueous carbon-based conductive coating material (EB-815, a product of Acheson (Japan) Limited) is sprayed and coated on the both surfaces of expanded metal made of copper (available from Nippon Metal Industry Co. Ltd.) Having a thickness of 32 μm (porosity: 50%) followed by drying. A negative electrode current collector, on which a conductive layer is formed, is thus obtained.

A total thickness (a sum of the thickness of the current collector and the thicknesses of the conductive layers) is 49 μm, and the through-pores are clogged with the conductive coating material almost completely. The hard carbon slurry is molded on the both surfaces of the negative electrode current collector by a roll coater followed by pressing. A negative electrode 7 having a thickness of 168 μm as a total thickness of the negative electrode (a sum of the thicknesses of the negative electrode layers on the both surfaces, the thicknesses of the conductive layers on the both surfaces, and the thickness of the negative electrode current collector) is thus obtained.

(Fabrication of Cell)

Three cells are fabricated as film capacitors in the same manner as Example 1 except that the negative electrode 7 having a thickness of 168 μm, and a positive electrode 7 coated so that a total thickness of the pressed positive electrode (a sum of the thicknesses of the positive electrode layers on the both surfaces, the thicknesses of the conductive layers on the both surfaces, and the thickness of the positive electrode current collector) is 197 μm as is in Example 1, are used. Number of the positive electrodes and the negative electrodes are 8 sheets respectively, and the thickness of the cells is 4.0 mm.

A lithium metal foil having a thickness of 150 μm and pressure bonded to a stainless steel net having a thickness of 80 μm is used as 400 mAh/g of lithium metal on the basis of the weight of the negative electrode active material, and one sheet of that is disposed at the outermost portion of the electrode lamination unit to oppose the negative electrodes. The weight of the positive electrode active material is 0.78 times the weight of the negative electrode active material.

(Evaluation of Characteristic of Cell)

After the cells are allowed to stand for 14 days in room temperature, one cell is disassembled. Because the lithium metal completely disappeared, it is judged that lithium ions to obtain capacitance of 8420 F/g or more per unit weight of the negative electrode active material are preliminary charged. Capacitance ratio per unit weight between the negative electrode active material and the positive electrode active material is 95.8.

The remaining two cells are charged at a constant current of 1000 mA until the cell voltage reached 3.6 V, and the cells are subjected to constant current—constant voltage charge to keep applying a constant voltage of 3.6 V for one hour. Subsequently, the cells are discharged at a constant current of 100 mA until the cell voltage reached 1.8 V.

The cycle of 3.6 V to 1.8 V is repeated, and the discharge capacity at the third cycle is 107 mAh as the mean value of the two cells (the discharging time is 1.07 hours). Also, the energy density is 14.4 Wh/l when the vertical length of the cell is 100 mm and the horizontal length is 50 mm.

After the cell capacities are evaluated, one cell is charged at a constant current of 1000 mA until the cell voltage reached 3.6 V. Subsequently, the cell is subjected to constant current—constant voltage charge to keep applying a constant voltage of 3.6 V for one hour. The cell is then disassembled within an argon box not to cause a short circuit between the positive electrodes and the negative electrodes, and eight sheets of the negative electrodes are taken out.

Subsequently, a three-electrode cell is fabricated by way of trial using each negative electrode as an operating electrode, and lithium metal as the counter electrode and the reference electrode. The cell is discharged at a constant current of 100 mA until the negative electrode potential reached 1.5 V. The full negative electrode capacity b is 927 mAh as a total of the discharge capacities of the eight sheets of the negative electrodes.

The remaining one cell is charged at a constant current of 1000 mA until the cell voltage reached 3.6 V. The cell is then subjected to constant current—constant voltage charge to keep applying a constant voltage of 3.6 V for one hour, and discharged at a constant current of 10 A until the cell voltage reached 1.8 V. The discharge capacity at this point in time is 68 mAh. The results are set forth in Table 7 below.

TABLE 7

| | Cell capacity a at 100 mA discharge (mAh) | Full negative electrode capacity b (mAh) | Energy density (Wh/l) | Discharge capacity at 10 A (mAh) | Capacity retention (%) | a/b |
| --- | --- | --- | --- | --- | --- | --- |
| Example 5 | 107 | 927 | 14.4 | 68 | 64 | 0.12 |

Comparative Example 3

Three cells are fabricated as film capacitors in the same manner as Example 1 except that a negative electrode 8 coated so that a total thickness of the pressed negative electrode (a sum of the thicknesses of the negative electrode layers on the both surfaces, the thicknesses of the conductive layers on the both surfaces, and the thickness of the negative electrode current collector) is 453 μm, and a positive electrode 8 coated so that a total thickness of the pressed positive electrode (a sum of the thicknesses of the positive electrode layers on the both surfaces, the thicknesses of the conductive layers on the both surfaces, and the thickness of the positive electrode current collector) is 200 μm, are used.

Number of the positive electrodes and the negative electrodes are 8 sheets respectively, and the thickness of the cells is 6.7 mm. A lithium metal foil having a thickness of 255 μm and pressure bonded to a stainless steel net having a thickness of 80 μm is used as 500 mAh/g of lithium metal on the basis of the weight of the negative electrode active material, and two sheets of that are disposed at the top and bottom of the electrode lamination unit to oppose the negative electrodes.

The weight of the positive electrode active material is 0.23 times the weight of the negative electrode active material.

(Evaluation of Characteristic of Cell)

The cells are allowed to stand for 14 days in room temperature, and one cell is disassembled. Because the lithium metal disappeared completely, it is judged that lithium ions to obtain capacitance of 748 F/g or more per unit weight of the negative electrode active material are preliminary charged. Capacitance ratio per unit weight between the negative electrode active material and the positive electrode active material is 8.50.

The remaining two cells are charged at a constant current of 1000 mA until the cell voltage reached 3.6 V. The cells are then subjected to constant current—constant voltage charge to keep applying a constant voltage of 3.6 V for one hour. Subsequently, the cells are discharged at a constant current of 100 mA until the cell voltage reached 1.8 V. The cycle of 3.6 V to 1.8 V is repeated, and the discharge capacity at the third cycle is 103 mAh as the mean value of the two cells (the discharging time is 1.03 hours). Also, the energy density is 8.30 Wh/l when the vertical length of the cell is 100 mm and the horizontal length is 50 mm.

After the cell capacities are evaluated, one cell is charged at a constant current of 1000 mA until the cell voltage reached 3.6 V. Subsequently, the cell is subjected to constant current—constant voltage charge to keep applying a constant voltage of 3.6 V for one hour. The cell is then disassembled within an argon box not to cause a short circuit between the positive electrodes and the negative electrodes, and eight sheets of the negative electrodes are taken out. Subsequently, a three-electrode cell is fabricated by way of trial using each negative electrode as an operating electrode, and lithium metal as the counter electrode and the reference electrode. The cell is discharged at a constant current of 100 mA until the negative electrode potential reached 1.5 V. The full negative electrode capacity b is 2625 mAh as a total of the discharge capacities of eight sheets of the negative electrodes.

The remaining one cell is charged at a constant current of 1000 mA until the cell voltage reached 3.6 V. The cell is then subjected to constant current—constant voltage charge to keep applying a constant voltage of 3.6 V for one hour, and discharged at a constant current of 10 A until the cell voltage reached 1.8 V. The discharge capacity at this point in time is 56 mAh. The results are set forth in Table 8 below.

TABLE 8

| | Cell capacity a at 100 mA discharge (mAh) | Full negative electrode capacity b (mAh) | Energy density (Wh/l) | Discharge capacity at 10 A (mAh) | Capacity retention (%) | a/b |
|---|---|---|---|---|---|---|
| Comparative Example 3 | 103 | 2625 | 8.3 | 56 | 54 | 0.04 |

When 0.05>a/b as in Comparative Example 3, although the capacity retention is high after the discharge at 10 A, the negative electrode became so thick that the energy density is deteriorated markedly.

The invention claimed is:

1. An organic electrolyte capacitor comprising:
   a positive electrode,
   a negative electrode, and
   an electrolyte capable of transporting lithium ions, wherein the positive electrode is able to support lithium ions and anions reversibly;
   the negative electrode is able to support the lithium ions reversibly;
   wherein the organic electrolyte capacitor having a cell capacity X (mAh) when in a charged state is discharged to half a charging voltage over 1 ±0.25 hours, and having a full negative electrode capacity Y (mAh) that is a capacity when the negative electrode in the charged state is discharged to 1.5 V (Li/Li+); and
   wherein a ratio of a positive electrode active material to a negative electrode active material being controlled to be within a range $0.05 \leq X/Y \leq 0.3$.

2. The organic electrolyte capacitor according to claim 1, wherein the lithium ions have been preliminarily supported on the negative electrode and/or the positive electrode.

3. The organic electrolyte capacitor according to claim 1, wherein
   a capacitance per unit weight of the negative electrode active material is three times or more a capacitance per unit weight of the positive electrode active material, and
   a weight of the positive electrode active material is larger than a weight of the negative electrode active material.

4. The organic electrolyte capacitor according to claim 1, further comprising:
   a positive electrode current collector and a negative electrode current collector, wherein
   each collector is provided with a through pores, the through pores penetrating through from the front surface to the back surface; and
   the lithium ions are supported on the negative electrode and/or the positive electrode by an electrochemical contact with a lithium electrode facing the negative electrode and/or the positive electrode.

5. The organic electrolyte capacitor according to claim 4, wherein a porosity of the electrode current collector is approximately 10% to approximately 79%.

6. The organic electrolyte capacitor according to claim 4, wherein the electrode current collector is made of an expanded metal, a punched metal, a metal net, a foam, or a porous foil provided with through pores by means of an etching.

7. The organic electrolyte capacitor according to claim 4, wherein the positive electrode current collector is made of a material selected from a group consisting of aluminum and stainless steel.

8. The organic electrolyte capacitor according to claim 4, wherein the negative electrode current collector is made of stainless steel, copper or nickel.

9. The organic electrolyte capacitor according to claim 4, wherein a shape of the through-pore in the electrode current collector is a circular shape, a rectangular shape or a cross shape.

10. The organic electrolyte capacitor according to claim 4, wherein the through-pores in the electrolyte current collector are filled in with conductive materials made of a conductive member and a binder resin.

11. The organic electrolyte capacitor according to claim 4, wherein a lithium electrode is formed on a lithium electrode current collector made of a conductive porous body; and at least part of the lithium electrode is filled in the pore portion of the lithium electrode current collector.

12. The organic electrolyte capacitor according to claim 1, wherein the negative electrode active material is a carbon material, a carbon fiber, a polyacenic material, a thin oxide or a silicon oxide.

13. The organic electrolyte capacitor according to claim 1, wherein a negative-electrode-active-material is an insoluble, infusible substrate; the substrate being a heat-treated product of an aromatic condensation polymer carrying a polyacenic skeleton structure with an atomic ratio of a hydrogen atoms to a carbon atoms being 0.50 to 0.05.

14. The organic electrolyte capacitor according to claim 1, wherein a positive-electrode-active-material is an activated carbon, a conductive polymer, a polyacenic material or a mesopore carbon wherein the mesopores having a pore diameter of 2.0 to 50 nm are noticeably developed.

15. The organic electrolyte capacitor according to claim 1, wherein the electrolyte is in the form of a gel or a solid.

* * * * *